US010783554B1

(12) United States Patent
Hylton et al.

(10) Patent No.: US 10,783,554 B1
(45) Date of Patent: Sep. 22, 2020

(54) GENERATION OF PROMOTION IN AN AUGMENTED REALITY

(71) Applicant: Groupon, Inc., Chicago, IL (US)

(72) Inventors: Neville Mark Hylton, London (GB); Radu Jitea, Dublin (IE); John Honan, Dublin (IE); Marcelo Butzke, Dublin (IE)

(73) Assignee: Groupon, Inc., Chicago, IL (US)

( * ) Notice: Subject to any disclaimer, the term of this patent is extended or adjusted under 35 U.S.C. 154(b) by 152 days.

(21) Appl. No.: 14/189,029

(22) Filed: Feb. 25, 2014

(51) Int. Cl.
*G06Q 30/02* (2012.01)
*G06K 9/00* (2006.01)

(52) U.S. Cl.
CPC ..... *G06Q 30/0259* (2013.01); *G06K 9/00671* (2013.01)

(58) Field of Classification Search
CPC combination set(s) only.
See application file for complete search history.

(56) References Cited

U.S. PATENT DOCUMENTS

| 8,355,948 | B2 | 1/2013 | Mason | |
|---|---|---|---|---|
| 8,606,645 | B1* | 12/2013 | Applefeld | G06T 19/006 705/14.25 |
| 10,008,010 | B2* | 6/2018 | Ferens | G06F 3/011 |
| 2011/0161875 | A1* | 6/2011 | Kankainen | G06F 3/0481 715/810 |
| 2011/0221656 | A1* | 9/2011 | Haddick | G02B 27/0172 345/8 |
| 2011/0225069 | A1* | 9/2011 | Cramer | G06Q 30/0601 705/27.1 |
| 2012/0093369 | A1* | 4/2012 | Ryu | G06K 9/00671 382/103 |
| 2012/0297014 | A1* | 11/2012 | Lahcanski | G06Q 30/0241 709/217 |

(Continued)

FOREIGN PATENT DOCUMENTS

KR 101450186 * 7/2012 ......... G06Q 30/0267

OTHER PUBLICATIONS

D. Kim, C. Oh, K. Hossain and C. Lee, "Interactional promotion content using augmented reality technology," The 19th Korea-Japan Joint Workshop on Frontiers of Computer Vision, Incheon, 2013, pp. 42-45, doi: 10.1109/FCV.2013.6485457. (Year: 2013).*

(Continued)

*Primary Examiner* — Marie P Brady
(74) *Attorney, Agent, or Firm* — Alston & Bird LLP

(57) ABSTRACT

A method, apparatus, and computer program product are disclosed for generating a promotion in an augmented reality. The method includes receiving camera data and location data associated with an consumer device, wherein the camera data includes camera orientation data; receiving map data based on the location data associated with the consumer device; identifying at least one provider location in a field of view that is associated with a promotion based on at least one relevance criteria; and generating an augmented reality based on the at least one provider location associated with the promotion and the camera data, wherein the augmented realty displays a provider location associated with a promotion overlaid onto the camera data. A corresponding apparatus and computer program product are also provided.

29 Claims, 13 Drawing Sheets

(56) References Cited

U.S. PATENT DOCUMENTS

| | | | |
|---|---|---|---|
| 2014/0025481 A1* | 1/2014 | Kang | G06Q 30/0241 |
| | | | 705/14.43 |
| 2014/0058825 A1* | 2/2014 | Raman | G06Q 30/02 |
| | | | 705/14.42 |
| 2014/0210857 A1* | 7/2014 | Liu | G06T 7/246 |
| | | | 345/633 |
| 2014/0214547 A1* | 7/2014 | Signorelli | G06Q 30/0267 |
| | | | 705/14.64 |
| 2014/0225917 A1* | 8/2014 | Ellenby | G09G 3/003 |
| | | | 345/633 |
| 2015/0148061 A1* | 5/2015 | Koukoumidis | H04W 4/022 |
| | | | 455/456.1 |
| 2015/0160036 A1* | 6/2015 | Liu | G09B 29/106 |
| | | | 701/533 |
| 2015/0163629 A1* | 6/2015 | Cheung | H04W 4/021 |
| | | | 455/456.1 |
| 2015/0348329 A1* | 12/2015 | Carre | G06F 16/9554 |
| | | | 345/633 |
| 2016/0373891 A1* | 12/2016 | Ramer | H04W 4/029 |

OTHER PUBLICATIONS

U.S. Appl. No. 61/644,352, filed May 8, 2012, In re: Chang et al. entitled Dynamic Promotion Analytics, 46 pages.

U.S. Appl. No. 13/829,581, filed Mar. 14, 2013, In re: Aggarwal et al. entitled Promotion Offering System, 71 pages.

U.S. Appl. No. 13/411,502, filed Mar. 2, 2012, In re: O'Brien et al. entitled Relevance System for Consumer Deals, 58 pages.

* cited by examiner

GENERATION OF PROMOTION IN AN AUGMENTED REALITY

TECHNOLOGICAL FIELD

Example embodiments of the present invention relate generally to augmented reality and, more particularly, to a method and apparatus for generating a promotion in an augmented reality.

BACKGROUND

Applicant has discovered problems with existing methods and systems for promotion management. Through applied effort, ingenuity, and innovation, Applicant has solved many of these identified problems by developing a solution that is embodied by the present invention and described in detail below.

BRIEF SUMMARY

Accordingly, a method, apparatus, and computer program product are provided for generating a promotion in an augmented reality. In an example embodiment a method is provided which includes receiving camera data and location data associated with an consumer device, the camera data includes camera orientation data; receiving map data based on the location data associated with the consumer device; identifying at least one provider location in a field of view that is associated with a promotion based on at least one relevance criteria; and generating an augmented reality based on the at least one provider location associated with the promotion and the camera data, the augmented realty displays a provider location associated with a promotion overlaid onto the camera data.

In an example embodiment of the method the identifying at least one provider location in a field of view that is associated with a promotion includes generating a first ranking of promotions, the respective promotions are associated with promotion parameters or a provider location, the first ranking of promotions is based on correlating a first relevance criteria to the promotion parameter or the provider location of the respective promotions; and comparing the ranking of promotions to a predetermined relevancy threshold. In an example embodiment, the identifying at least one provider location is a field of view that is associated with a promotion further also includes receiving a second relevance criteria; and generating a second ranking of promotions; the second ranking of promotions is generated based on correlating the first relevance criteria and the second relevance criteria to the promotion parameters or provider locations of the respective promotions.

In an example embodiment the method also includes causing the augmented reality to be displayed on a user interface. In an example embodiment the method also includes receiving a proximate consumer indication associated with a first consumer device which indicates a second consumer device associated with the first consumer device proximate to the consumer device; the promotion is based on the proximate consumer indication. In an example embodiment of the method, the augmented reality further includes radial proximity display. In an example embodiment the method also includes receiving a provider location selection indication; and causing an impression comprising at least a portion the promotion parameters associated with the selected provider location to be displayed on a user interface.

In an example embodiment of the method, the provider location selection indication is based on the camera orientation data. In an example embodiment of the method, the impression comprising at least a portion of the promotion parameters displayed includes a promotion parameter summary; the method further includes receiving a promotion parameter summary selection indication; and causing an impression comprising the promotion parameters to be displayed on a user interface. In an example embodiment of the method, the promotion parameters include a predetermined start and end time; and the relevance criteria is the start and end time of the promotion parameters.

In an example embodiment of the method, the relevance criteria is a predetermined number of consumer device within a proximity radius of a provider. In an example embodiment of the method, the relevance criteria is a real time provider notice. In an example embodiment of the method, the relevance criteria is a predetermined number of consumers associated with the consumer device. In an example embodiment of the method, the relevance criteria is at least one attribute of a consumer profile associated with the consumer device. In an example embodiment of the method, the relevance criteria is at least one consumer search data.

In an example embodiment of the method, the relevance criteria is a consumer preference inputs. In an example embodiment of the method, the provider location selection indication is based on a consumer input from a user interface. In an example embodiment of the method, the relevance criteria is a proximity radius. In an example embodiment of the method, the relevance criteria is a predetermined number of viewings of a promotion or a provider location associated with a promotion. In an example embodiment of the method, the relevance criteria is weather. In an example embodiment of the method, the relevance criteria is environment. In an example embodiment of the method, the relevance criteria is the location data and a location data associated with an associated consumer.

In an example embodiment an apparatus is provided including at least one processor and at least one memory including computer program code, the at least one memory and the computer program code configured to, with the processor cause the apparatus to at least: receive camera data and location data associated with an consumer device, the camera data includes camera orientation data; receive map data based on the location data associated with the consumer device; identify at least one provider location in a field of view that is associated with a promotion based on at least one relevance criteria; and generate an augmented reality based on the at least one provider location associated with the promotion and the camera data, the augmented realty displays a provider location associated with a promotion overlaid onto the camera data.

In an example embodiment of the apparatus, the identifying at least one provider location in a field of view that is associated with a promotion includes generating a first ranking of promotions, respective promotions are associated with promotion parameters or a provider location, the first ranking of promotions is based on correlating a first relevance criteria to the promotion parameter or the provider location of the respective promotions; and comparing the ranking of promotions to a predetermined relevancy threshold. In an example embodiment of the apparatus, the identifying at least one provider location is a field of view that is associated with a promotion further includes: receiving a second relevance criteria; and generating a second ranking of promotions; the second ranking of promotions is generated based on correlating the first relevance criteria and the second relevance criteria to the promotion parameters or provider locations of the respective promotions.

The at least one memory and the computer program code may be further configured to, with the processor, cause the apparatus of an example embodiment to cause the apparatus to cause the augmented reality to be displayed on a user interface. The at least one memory and the computer program code may be further configured to, with the processor, cause the apparatus of an example embodiment to cause the apparatus to receive a proximate consumer indication associated with a first consumer device which indicates a second consumer device associated with the first consumer device proximate to the consumer device; the promotion is based on the proximate consumer indication. In an example embodiment of the apparatus the augmented reality further includes radial proximity display. The at least one memory and the computer program code may be further configured to, with the processor, cause the apparatus of an example embodiment to receive a provider location selection indication; and cause an impression comprising at least a portion the promotion parameters associated with the selected provider location to be displayed on a user interface.

In an example embodiment of the apparatus, the provider location selection indication is based on the camera orientation data. In an example embodiment of the apparatus the impression comprising at least a portion of the promotion parameters displayed includes a promotion parameter summary; the at least one memory and the computer program code are further configured to, with the processor, cause the apparatus to: receive a promotion parameter summary selection indication; and cause an impression comprising the promotion parameters to be displayed on a user interface. In an example embodiment of the apparatus, the promotion parameters include a predetermined start and end time; and the relevance criteria is a start and end time of the promotion parameters. In an example embodiment of the apparatus, the relevance criteria is a predetermined number of consumer device within a proximity radius of a provider.

In an example embodiment of the apparatus, the relevance criteria is a real time provider notice. In an example embodiment of the apparatus, the relevance criteria is a predetermined number of consumers associated with the consumer device. In an example embodiment of the apparatus, the relevance criteria is at least one attribute of a consumer profile associated with the consumer device. In an example embodiment of the apparatus, the relevance criteria is at least one consumer search data. In an example embodiment of the apparatus, the relevance criteria is a consumer preference inputs. In an example embodiment of the apparatus, the provider location selection indication is based on a consumer input from a user interface. In an example embodiment of the apparatus, the relevance criteria is a proximity radius.

In an example embodiment of the apparatus, the relevance criteria is a predetermined number of viewings of a promotion or a provider location associated with a promotion. In an example embodiment of the apparatus, the relevance criteria is weather. In an example embodiment of the apparatus, the relevance criteria is environment. In an example embodiment of the apparatus, the relevance criteria is the location data and a location data associated with an associated consumer.

In an example embodiment a computer program product is provided including at least one non-transitory computer-readable storage medium having computer-executable program code portions stored therein, the computer-executable program code portions comprising program code instructions configured to: receive camera data and location data associated with an consumer device, the camera data includes camera orientation data; receive map data based on the location data associated with the consumer device; identify at least one provider location in a field of view that is associated with a promotion based on at least one relevance criteria; and generate an augmented reality based on the at least one provider location associated with the promotion and the camera data, the augmented realty displays a provider location associated with a promotion overlaid onto the camera data.

In an example embodiment of the computer program product, the identifying at least one provider location in a field of view that is associated with a promotion includes: generating a first ranking of promotions, the respective promotions are associated with promotion parameters or a provider location, the first ranking of promotions is based on correlating a first relevance criteria to the promotion parameter or the provider location of the respective promotions; and comparing the ranking of promotions to a predetermined relevancy threshold. In an example embodiment of the computer program product, the identifying at least one provider location is a field of view that is associated with a promotion further includes: receiving a second relevance criteria; and generating a second ranking of promotions; the second ranking of promotions is generated based on correlating the first relevance criteria and the second relevance criteria to the promotion parameters or provider locations of the respective promotions.

The computer-executable program code portions of an example embodiment of the computer program product may also include program code instructions configured to: cause the augmented reality to be displayed on a user interface. The computer-executable program code portions of an example embodiment of the computer program product may also include program code instructions configured to: receive a proximate consumer indication associated with a first consumer device which indicates a second consumer device associated with the first consumer device proximate to the consumer device; the promotion is based on the proximate consumer indication. In an example embodiment of the computer program product, the augmented reality further includes radial proximity display.

The computer-executable program code portions of an example embodiment of the computer program product may also include program code instructions configured to: receive a provider location selection indication; and cause an impression comprising at least a portion the promotion parameters associated with the selected provider location to be displayed on a user interface. In an example embodiment of the computer program product, the provider location selection indication is based on the camera orientation data.

In an example embodiment of the computer program product, the impression comprising at least a portion of the promotion parameters displayed includes a promotion parameter summary; the computer-executable program code portions may also include program code instructions configured to: receiving a promotion parameter summary selection indication; and causing an impression comprising the promotion parameters to be displayed on a user interface. In an example embodiment of the computer program product, the promotion parameters comprised a predetermined start and end time; and the relevance criteria is a start and end time of the promotion parameters. In an example embodiment of the computer program product, the relevance criteria is a predetermined number of consumer device within a proximity radius of a provider.

In an example embodiment of the computer program product, the relevance criteria is a real time provider notice. In an example embodiment of the computer program product, the relevance criteria is a predetermined number of consumers associated with the consumer device. In an example embodiment of the computer program product, the relevance criteria is at least one attribute of a consumer profile associated with the consumer device. In an example embodiment of the computer program product, the relevance criteria is at least one consumer search data. In an example embodiment of the computer program product, the relevance criteria is a consumer preference inputs. In an example embodiment of the computer program product, the provider location selection indication is based on a consumer input from a user interface.

In an example embodiment of the computer program product, the relevance criteria is a proximity radius. In an example embodiment of the computer program product, the relevance criteria is a predetermined number of viewings of a promotion or a provider location associated with a promotion. In an example embodiment of the computer program product, the relevance criteria is weather. In an example embodiment of the computer program product, the relevance criteria is environment. In an example embodiment of the computer program product, the relevance criteria is the location data and a location data associated with an associated consumer.

In yet another example embodiment, an apparatus is provided that includes means for receiving camera data and location data associated with an consumer device, the camera data includes camera orientation data; means for receiving map data based on the location data associated with the consumer device; means for identifying at least one provider location in a field of view that is associated with a promotion based on at least one relevance criteria; and means for generating an augmented reality based on the at least one provider location associated with the promotion and the camera data, the augmented realty displays a provider location associated with a promotion overlaid onto the camera data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
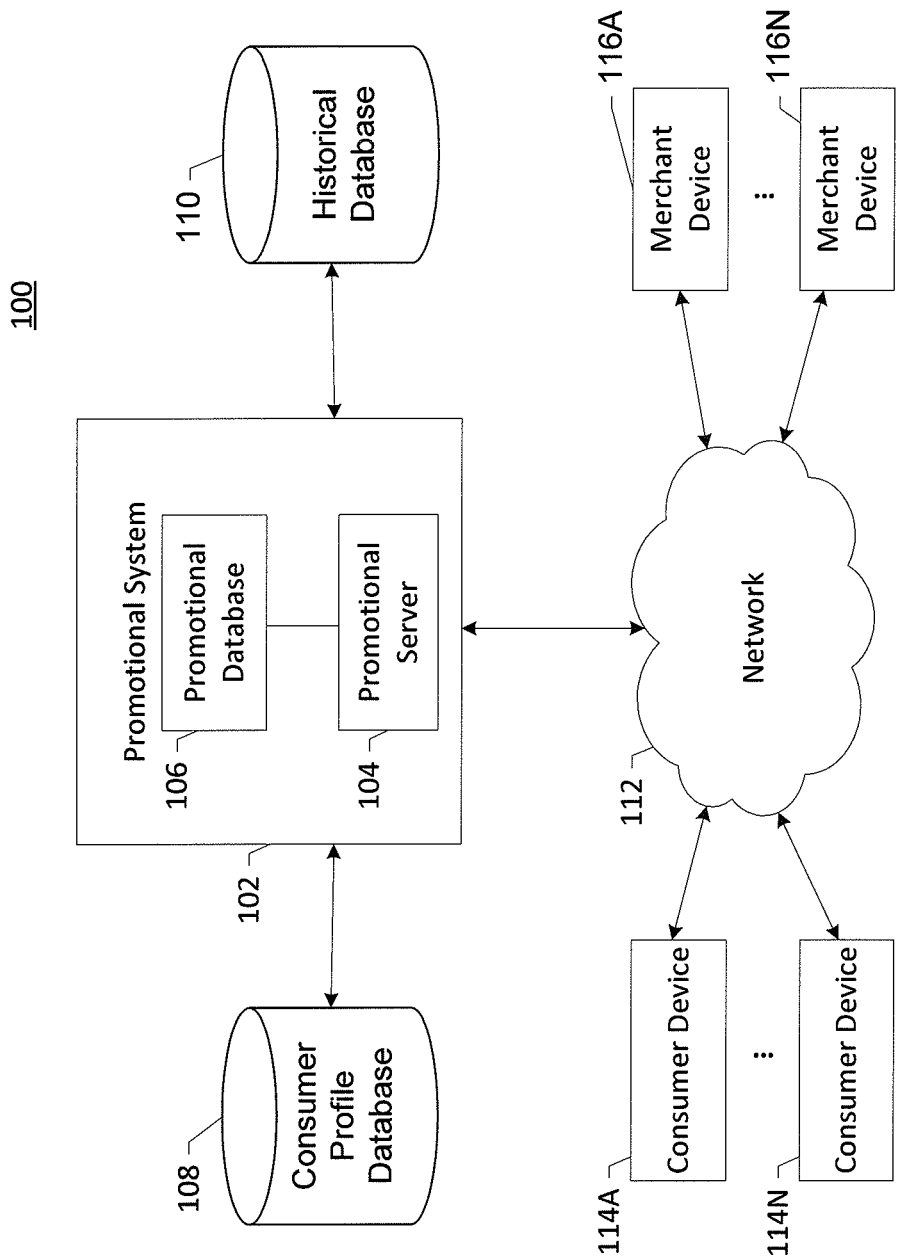
Figure 2:
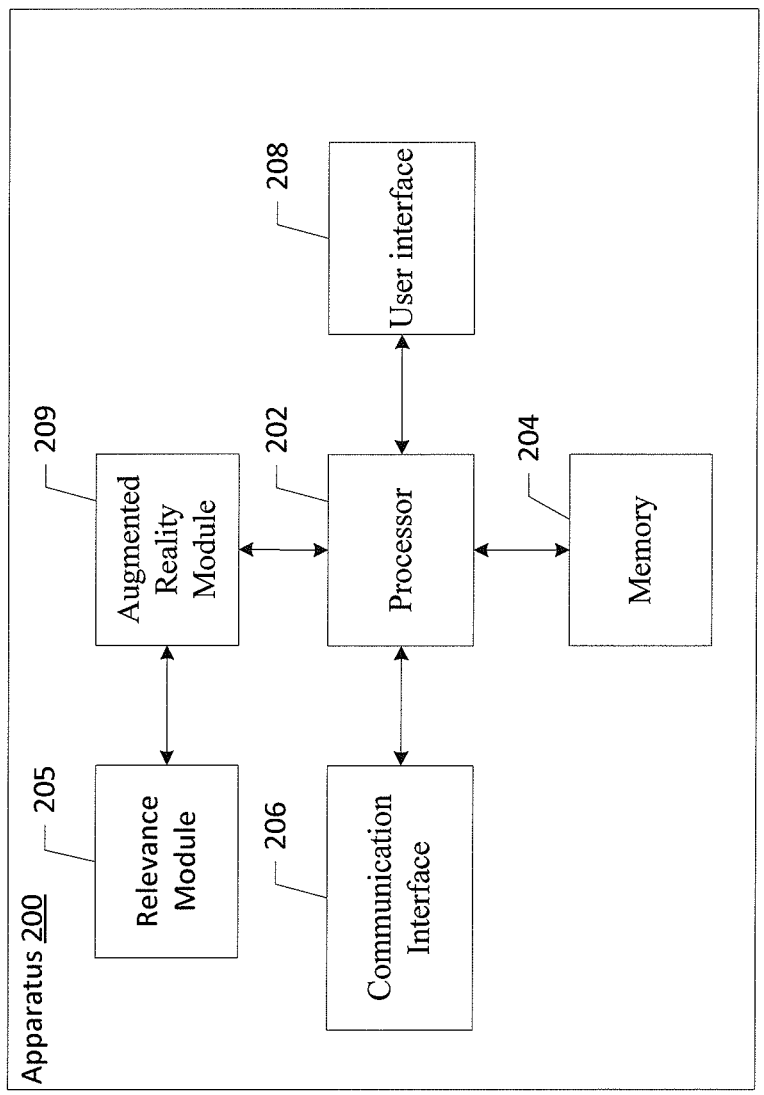
Figure 3:
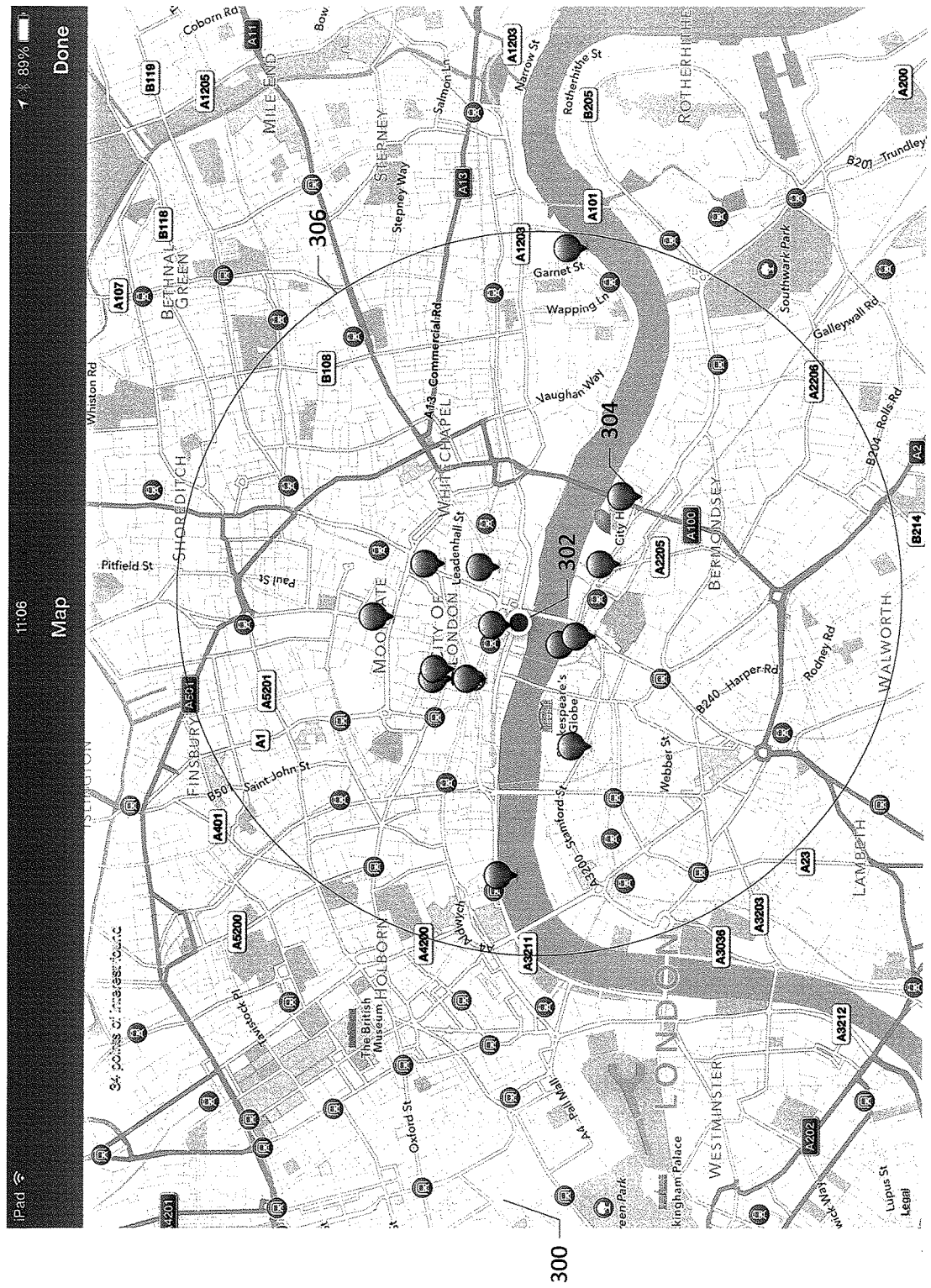
Figure 4:
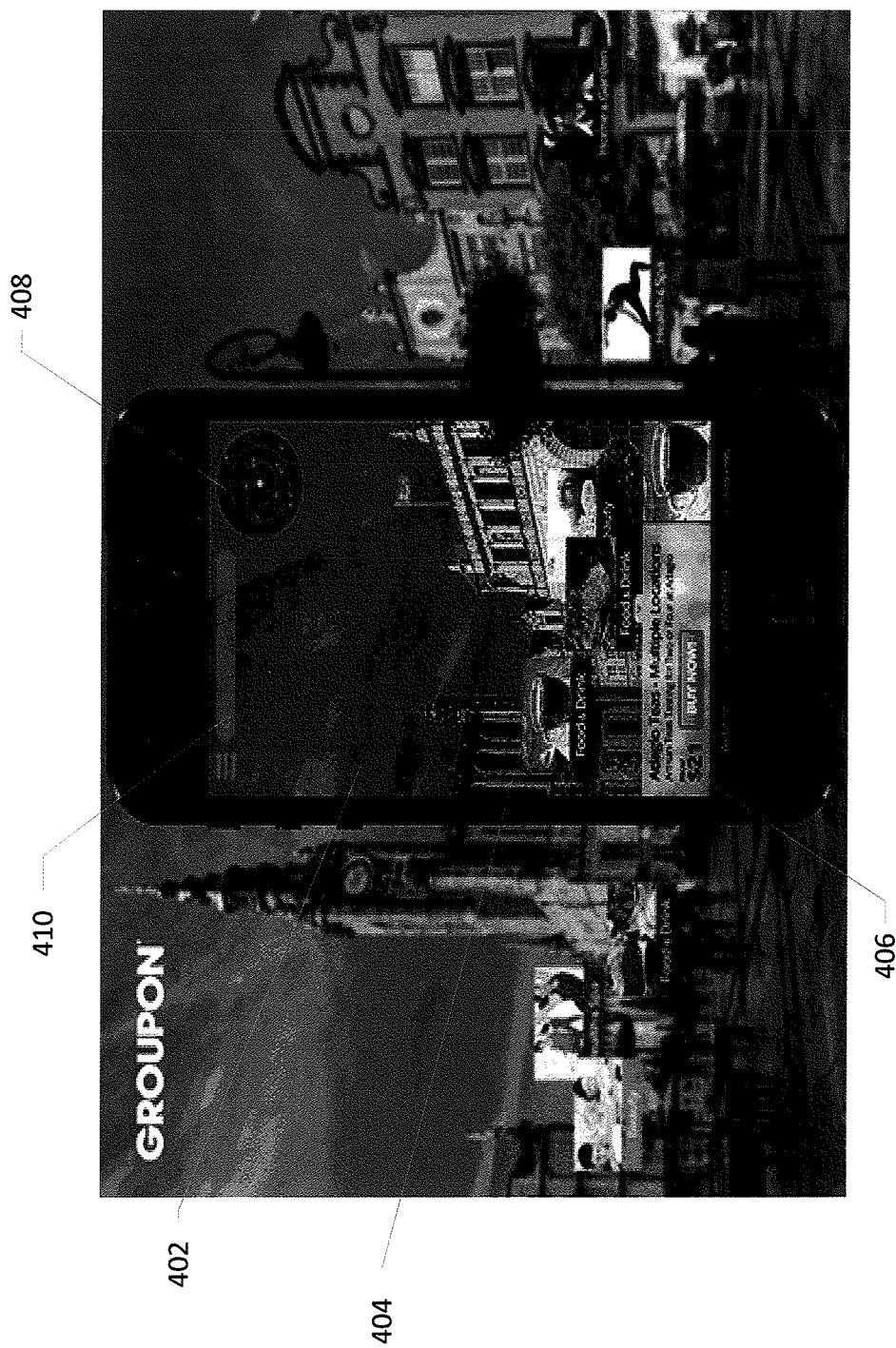
Figure 12:
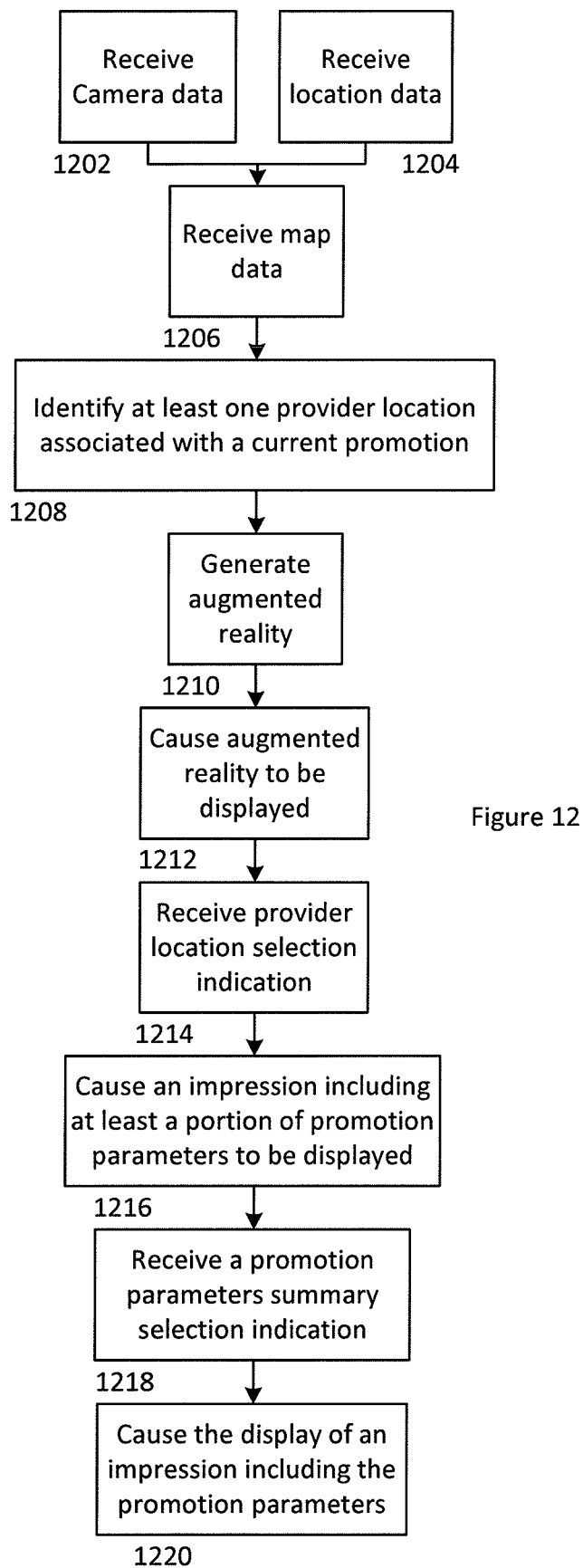
Figure 13:
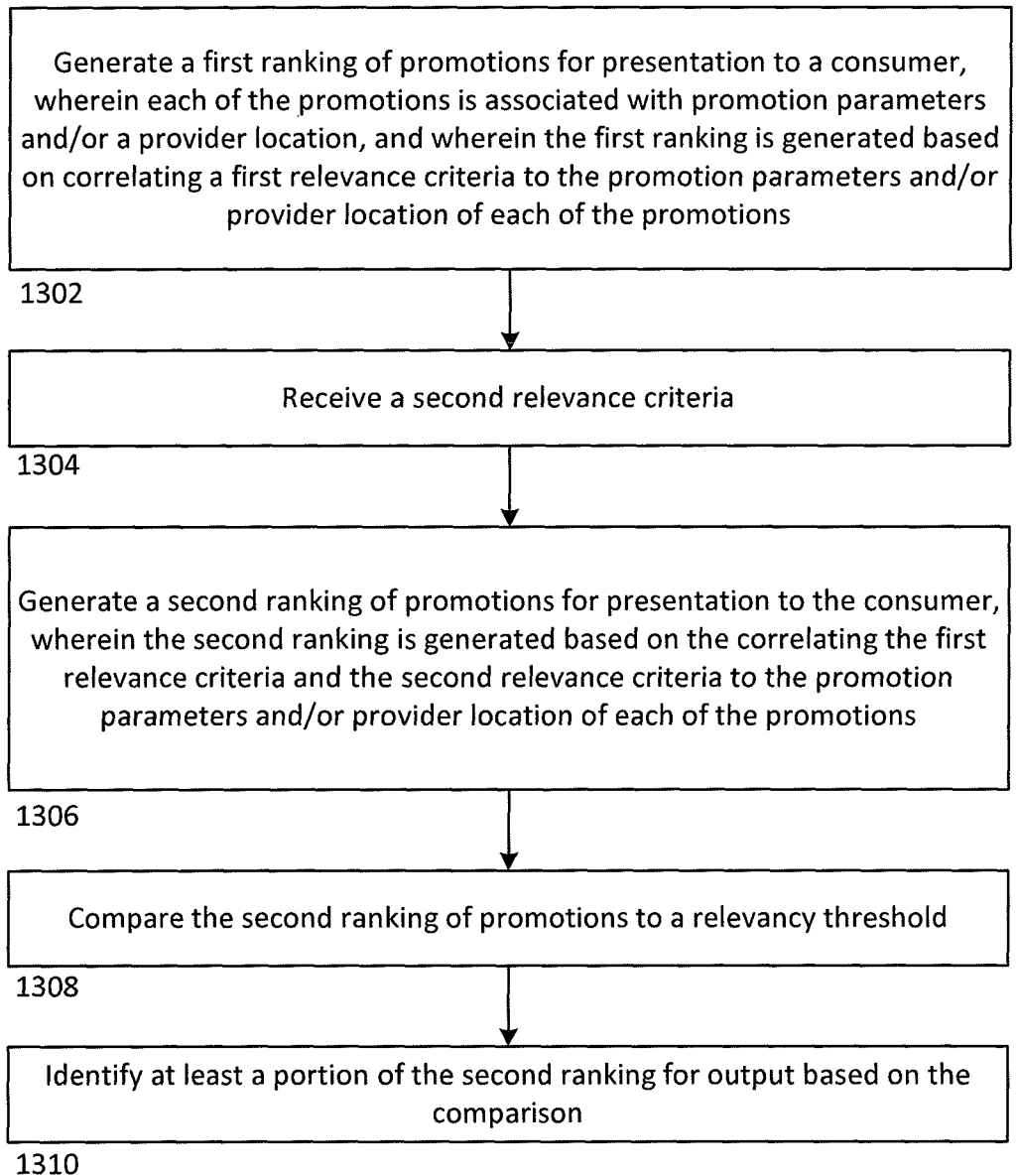

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates block diagram of an apparatus that may be specifically configured for generating promotions in an augmented reality in accordance with an example embodiment of the present invention;

FIG. 3 illustrates an example map, which may be a portion of a map data in accordance with some example embodiments of the present invention;

FIGS. 4-11 illustrate an example augmented realities displayed on a user interface in accordance with some example embodiments of the present invention;

FIG. 12 illustrates a flow chart of an example process for generating an augmented reality in accordance with an example embodiment of the present invention; and FIG. 13 illustrates a flow chart of an example process for identifying provider locations associated with a promotion based on relevance in accordance with an example embodiment of the present invention.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, merchant, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example a provider may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "impression" may include a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, "consumer attributes" may include, but is not limited to, the consumer's name, consumer's age, consumer's location (e.g., "home", "work", or other visited places such as future vacation locations, cities that friends and/or family live in locations, business trip locations and the like), consumer's gender, consumer's tenure using the promotion system, consumer's email domain, consumer's IP address, consumer's occupation, consumer's educational background, consumer's previously accepted and/or rejected promotion program offerings, consumer's gender and the like.

As used herein, the term "explicit data," may include, but is not limited to user-provided data in user profiles, preferences, and/or promotion purchase history. In some example, "explicit data" may allow the promotional system to better target promotion types or impressions to consumers. In some examples, a consumer may be more likely to purchase a promotion if the impression advertising the promotion is of interest to the consumer than if the associated promotion was selected at random.

As used herein, the term "implicit data," may include, but is not limited to data that may be user-provided for a purpose other than for use on the promotional system and/or detected by the promotional system, may allow a promotional system to gather information on consumer behaviors, preferences, and preferred locations. Example implicit data may include, but is not limited to data that is indicative of a consumer's browsing and/or search history, detected location, or the consumer's social network profile information, for example.

As used herein, the term "consumer device" may include, but is not limited to a device or module operable to access a website (e.g., using a web browser), a remote server, or execute a mobile application, such as a laptop, mobile phone, tablet, personal computer, wearable computer, or the like. A consumer device may place a request, such as in response to a consumer activity facilitated by a user interface such as, without limitation, clicking a link, selecting particular text or image data, and/or inputting or entering data, touch, gesture, consumer device motion such as a shake or flick, eye movement, or the like.

"Aggregation" refers to processes whereby data is gathered, consolidated, formatted, stored, and expressed in summary form or a common format. "Aggregation" by consumer or "consumer aggregation" may refer to gathering, consolidating, formatting, storing, and expressing data (e.g., searched attributes) associated to a particular consumer. For example, consumer aggregation may include accessing or expressing consumer search data or searched attributes associated with the consumer received from the search system or from a particular consumer device. Similarly, aggregation by location or location aggregation may refer to gathering, consolidating, formatting, storing, and expressing data (e.g., consumer search data or searched attributes) associated with a particular location (e.g., Chicago) or hyper-location (e.g., Wrigleyville neighborhood of Chicago).

"Determining relevance" may include determining which of a plurality of consumer promotions to present to a consumer or identifying a provider location associated with a promotion. The plurality of consumer promotions may be for goods and/or for services.

"Augmented reality" may be a view of a physical, real world, environment whose elements are augmented or supplemented by computer generated sensory input such as sound, video, graphics, location data, or the like. For example, a view of a street as captured by a camera associated with a consumer device which is supplemented with provider locations associated with a promotion.

Overview

As connectivity becomes more prevalent in the daily lives of consumers, providers must adapt to provide consumers data in formats that incorporate the internet, internet accessible devices, connected technologies and other readily available technologies, for example, portable and wearable electronic devices with cameras and location sensors. Specifically, portable electronic devices, such as smart phones, tablet computers, electronic book readers, laptop computers, personal data assistants (PDA), wearable computers, or the like, may also provide information or different interfaces to users other than two dimensional user interfaces, maps, or the like. One such technology relates to augmented reality, which in some examples, makes use of the camera data (or other view related data received from a portable or otherwise wearable device), location data and information from the internet or other data repository to augment a view, in real time or near real time, with tagged elements within a captured area.

A method, apparatus, and computer program product are provided in accordance with an example embodiment of the present invention in order to generate promotions for viewing one or more available promotions in an augmented reality display or setting. In some examples, a display that enables augmented reality, virtual reality or other form of image tagging may determine a field of view from a camera on a portable device, a field of view of a user or consumer as detected by wearable technology, a combination of the both and/or the like. Having an indication of a field of view by a current consumer, a device, a display, or the like, the method, apparatus, and computer product described herein may then enable or otherwise detect certain elements within the view (e.g., the field of view captured by the camera, the current field of view of the camera, or the like) to be tagged or otherwise identified. For example, a consumer looking though a pair of connected glasses may have a particular shop or restaurant identified or otherwise tagged in the field of view. Based on an identification of the certain elements, the method, apparatus, and computer product described herein may then overlay certain promotions onto the field of view.

In some example embodiments the promotions that are shown using augmented reality include each of the promotions that are currently available via a promotion and marketing service. In some examples, the promotions displayed are limited using various parameters to provide a usable and navigable augmented reality. For example, if 300 promotions were available and displayed, the promotions may fill the field of view and render the augmented reality unusable or confusing. As such, as the number of promotions displayed at any given time may be limited. In some examples, the geographic area of the promotions that are available may be limited to what the consumer can see, where in other examples the geographic area may be constrained by proximity. In further examples, certain of the promotions may be highlighted or otherwise emphasized based on relevance, such as based on consumer input, consumer search data, consumer attributes, consumer input proximity radius, consumer proximity data, promotion start and end times, promotion availability, consumer purchase history, consumer historical location data, weather, environment, number of consumers in a group associated with the consumer device, number of views of a promotion or provider location, real time provider notice, number of consumer devices within a predetermined radius of a provider, associated consumer locations, or the like. In other examples, those promotions that are currently available (e.g., a reservation is available) may be identified. Alternatively or additionally, the promotions that are displayed may include a subset of promotions that are available based on relevance, interest, availability or the like.

In some examples described herein, augmented reality may be used by the promotion and marketing service to benefit, in some examples, one or more providers. In some examples, the promotion and marketing service may determine or otherwise ascertain a field of view of a user, a current view of a camera, or the like. In such cases, the promotion and marketing service, the provider, or the like may offer certain discounted promotions to entice or otherwise engage the consumer in instance in which the consumer is currently looking toward the provider. For example, a restaurant having a certain number of current openings may offer an additional discounted promotion for consumers who look their way. In another example, a loyalty promotion may be offered to a consumer based on previous purchases from a provider or group of providers, based on consumer purchase history. In yet another example, a discovery incentive may be offered to entice new consumers who have never purchased from a provider or in a promotion category or never viewed the promotion or provider location previously, based on consumer purchase history.

In another example, the promotion parameters may be changed based on the number of views of a provider location or promotion. For example, in an instance in which a consumer has viewed a provider location or promotion a predetermined number of times, the promotion and marketing service may determine that the consumer is interested, but may not find the price favorable. The promotion parameters may be changed to increase the savings or lower the purchase price to entice the consumer to purchase the promotion. For example, a skydiving promotion for $300 dollars may be changed to $200 on the fourth view. In another example, a promotion may be based on a real time provider notice. For example, in an instance in which the consumer traffic is low such as a restaurant in the afternoon, the provider may send a real time notice to the promotion and marketing system providing a limited time promotion at a discount or larger discount than normal, such as 50% off any meal.

In an example embodiment, social media may be utilized in conjunction with the promotions presented in augmented reality. For example, the promotion and marketing service may access the social media application to retrieve consumer profile data used for relevance determinations. In another example, the social media may be accessed to retrieve consumer profile data of associated consumer members of the social media for a relevance determination based on the consumer and/or associated consumer profile data. In another example in which the promotion presented in the augmented reality is group based, the promotion may be posted to the social media to attract other members of the social media, or the social media or other location application may be accessed to locate associated members of the social media or location application and present the promotion to the group of consumers. In another example embodiment, social media may be used to post reviews, experiences, pictures, invitations to other consumers, or the like.

In some embodiments, supplementation of the current view may also include various methods to visibly present the field of view at night or in low visibility, such as fog. For example, the augmented reality displayed may supplement the field of view with night vision, infra-red or the like. In another example, the field of view from the camera is substituted or supplemented with a stored view of the location in the current view from a database, such as a Google Street View®. The supplementation of the current view may be accomplished, in some examples, based on a universal or device clock time associated with dusk at the consumer device location, a user input indicating low visibility or weather data indicating low viability. The visibility supplementation of the augmented reality allows the user to see the field of view as well as if the field of view had been captured during the day or without the visibility constraint, thus allowing the consumer to see the provider locations within a visible field of view.

In an example embodiment, a biometric sensor, such as a camera equipped to scan fingerprints or irises, or a microphone for voice identification, may be used to collect biometric data associated with the consumer. The biometric data may be used to access consumer profile data for use in a relevance determination, forgoing manual entry of consumer information or identifiers. In another example, the biometric sensor may receive biometric data of proximate consumers for a relevance determination of promotions based on the consumer profile data and/or the proximate consumer profile data.

In an example embodiment, the field of view may be locked allowing the consumer to change the camera orientation, without changing the field of view, such as when the augmented reality is displayed on a smartphone, laptop, or the like. For example, if the consumer captures a field of view with an arm raised it may be uncomfortable to interact with the displayed view and promotions while maintaining this position and/or camera orientation. The lock of the field of view may be automatic, without user interaction for a predetermined period or locked and/or unlocked by a consumer input, allowing the consumer to change the field of view as desired and interacted with the displayed augmented reality.

Alternatively or additionally and in some example embodiments, other incentives (e.g., points, gifts, credits, discounts, or the like) may be included within the displayed augmented reality. For example, in some cases an incentive may be provided to a user in an instance in which the consumer views a specific promotion, views a particular number of promotions, accesses a clue associated with a promotion having a predetermined point value (e.g., consumer may use the augmented reality to search and view the promotion associated with the clue to gain the incentive points), and/or the like.

Alternatively or additionally, augmented reality may be used to display accumulated savings for a group of promotions. For example, as a consumer selects promotions, and in some examples purchases the promotions, a savings counter may be displayed within the augmented reality highlighting the savings attained for one or more selected promotions. In further examples, by capturing the savings for one or more selected promotions, additional savings may be applied once a savings threshold is satisfied, a particular number of promotions has been purchased and/or the like.

Alternatively or additionally, augmented reality may be used to facilitate communication with a promotion and marketing service, a help desk, a particular provider, or the like. To facilitate communication, the augmented reality may display a contact link for causing video, audio, or text communications between the consumer and the provider and or the promotion and marketing service, the help desk, and/or the provider. For example, in an instance in which the promotion purchase fails, a promotion is booked for the incorrect time, the consumer desires to transfer the promotion to another consumer, or the like, the consumer may desire to contact a promotion and marketing service, a help desk, a particular provider or the like.

Alternatively or additionally, augmented reality may also include impressions or the like which include video impression. For example, a promotion for a spa treatment may have a video impression to further entice the consumer to purchase the promotion, such as views of a message, facial, hot tub, or the like.

Alternatively or additionally, location data associated with the consumer when generating the augmented reality may be accumulated and used to provide consumer information to providers. Consumer location information may then be aggregated or otherwise processed to include the number of consumers which have walked by the provider location without entering, the number of consumers that did enter the provider location, time spent at the provider location, number of consumer that viewed the provider location or associated promotions, the number of consumers that purchased a promotion from the provider location, or the like.

Alternatively or additionally, the consumer location data may also include a proximity data that would enable or otherwise facilitate the display of a promotion when a consumer, as defined by their location data, is within a specified proximity position. For example, the augmented reality may display a promotion when the consumer proximity data is within the proximity position or satisfies a proximity threshold of the entry to a provider location. In another example, the augmented reality may display a promotion when the consumer proximity data is within the proximity position of the cash register or other check out area.

Additionally or alternatively, provider webpages, advertisements (e.g. billboards, newspaper, magazine, fliers, business cards, or the like), emails, or the like may include one or more augmented reality cues. Augmented reality cues may be a QR codes, internet links, or other dedicated interactive stimuli. In an instance in which the augmented reality cue is read, scanned, selected, or otherwise interacted with, the consumer device may generate an augmented reality based on the augmented reality cue. The augmented reality based on the augmented reality cue may display a provider location associated with a promotion which is intron associated with the provider originating the augmented reality cue.

Additionally or alternatively, augmented reality cues may be embedded into promotions on promotion and marketing service websites. For example, a promotion impression, provider review, promotion review, goods or service review, or the like may include the augmented reality cue. A consumer may scan, read, select, or otherwise interact with the augmented reality cue to generate an augmented reality displaying a provider location associated with a promotion adding further context to the review, provider, promotion, or the like.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, wearable computer, watch, glasses, or any combination of the aforementioned devices.

In this regard, FIG. 1 discloses an example computing system within which embodiments of the present invention may operate. A promotion and marketing service may manage a promotional system 102 for managing the offer, purchase, and redemption of a set of promotions. Consumers and merchants may access the promotional system 102 via a network 112 (such as the Internet, or the like) using consumer devices 114A-114N, and/or computer devices 116A through 116N, respectively. The promotional system 102 may comprise a promotional server 104 in communication with a promotional database 106 that stores the set of promotions managed by the promotion and marketing service. The promotional system may further have access to a consumer profile database 108 that stores consumer attributes which may be used to determine the relevance of each promotion stored in the promotional database 106, and a historical database 110 storing information regarding previously offered promotions, redemptions of the promotions, views of the promotions, or the like. In various embodiments, promotional database 106, consumer profile database 108, and historical database 110 may be distinct databases, or may alternatively refer to a single database. The promotional system 102 and/or the user devices 114 may receive location data and camera data associated with a consumer device, receive map data based on the location data associated with the consumer device, identify at least one provider location in a field of view that is associated with a promotion, and generate an augmented reality based on the at least one provider location associated with the promotion and the camera data, as will be described below.

Example Apparatus

The promotional system 102 or consumer device 114 may be embodied by an apparatus, such as apparatus 200 shown in FIG. 2. As illustrated in FIG. 2, the apparatus 200 may include a processor 202, a memory 204, a user interface 206, a communications module 208, an augmented reality module 209, and a relevance module 205, and may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include a user interface 206 that may, in turn, be in communication with processor 202 to provide output to the user and, in some embodiments, to receive an indication of a user input. As such, the user interface 206 may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor 202, or user interface circuitry comprising the processor 202, may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200 (e.g., promotional server 104 or, more generally, promotional system 102, other user devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The augmented reality module 209 may be configured to cause the processor 202 to receive at least camera data, location data, and/or the like associated with an consumer device, receive map data based on the location data associated with the consumer device, identify at least one provider location in a field of view that is associated with a promotion, and generate an augmented reality based on the at least one of provider location and/or camera data, as will be described in greater detail below. The augmented reality module 209 may be further configured to cause the augmented reality to be displayed on the user interface 206. In an example embodiment the augmented reality module 209 may be further configured to cause processor 202 and/or the communication module 208 to receive a proximate consumer indication associated with a first consumer device which indicates a second consumer device is associated with the first consumer device (e.g. there are two or more consumers associated with the consumer device and they are jointly seeking a promotion). In an example embodiment, the augmented reality module may be further configured to cause the processor 202 to receive a provider location selection indication, and cause an impression including at least a portion of promotion parameters (e.g. a promotion summary such as price, provider, savings, or the like) associated with the selected provider location to be displayed on a user interface 206. In an example embodiment, the augmented reality module 209 may be configured to cause the processor 202 to receive a promotion parameter summary selection indication, and cause an impression including promotion parameters (e.g. additional promotion parameter details) to be displayed on a user interface 206.

The relevance module 205 may be configured to with the augmented reality module 209, cause the processor 202 to identify at least one provider location in a field of view associated with a promotion. The relevance module 205 may be separate in some examples from or integrated with the augmented reality module 209. In an example embodiment, the relevance module 205 may identify at least one provider location within a field of view associated with a promotion by generating a first ranking of promotions, wherein respective promotions are associated with promotion parameters or a provider location, wherein the first ranking of promotions is based on correlating a first relevance criteria to the promotion parameter or the provider location of the respective promotions; and comparing the ranking of promotions to a predetermined relevancy threshold. In another example embodiment, the relevance module 205 may further identify at least one provider location within a field of view associated with a promotion by receiving a second relevance criteria; and generating a second ranking of promotions; wherein the second ranking of promotions is generated based on correlating the first relevance criteria and the second relevance criteria to the promotion parameters or provider locations of the respective promotions. Additional examples with respect to relevance may be found below in FIG. 12.

In an example embodiment, the relevance module 205 may identify at least one provider location in a field of view associated with a promotion based on a predetermined number of consumer devices within a proximity radius of a provider. In an example embodiment, the relevance module 205 may identify at least one provider location in a field of view associated with a promotion based on a real time provider notice (e.g., short duration and/or impromptu promotion). In another example, the relevance module 205 may identify a provider location in a field of view associated with a promotion based on a predetermined number of consumers associated with the consumer device. In yet another example, the relevance module 205 may identify at least one provider location in a field of view associated with a promotion based on at least one consumer attribute of a consumer profile associated with the consumer device. In still another example embodiment, the relevance module 205 may identify at least one provider location in a field of view that is associated with a promotion based on at least one consumer search data.

In an example embodiment, the relevance module 205 may identify at least one provider location within a field of view that is associated with a promotion based on a consumer preference (e.g. likes and/or dislikes, of foods, events, times, days of the week, areas of a city, people, or the like). In another example, the relevance module 205 may identify at least one provider location within a field of view that is associated with a promotion based on a consumer input (e.g. date, time, indoors, outdoors, wish list, or the like). In an example, the relevance module 205 may identify at least one provider location within a field of view associated with a promotion based on a proximity radius (e.g. a radial distance around the consumer device 114 location). In yet another example, the relevance module 205 may identify at least one provider location within a field of view associated with a promotion based on a predetermined number of views of a promotion or provider location.

In an example embodiment, the relevance module 205 may identify at least one provider location within a field of view associated with a promotion based on weather (e.g. rain, sunny, temperature that may affect the desirability of indoor or outdoor activities or the travel distance for participation in the promotion). In an example, the relevance module 205 may identify at least one provider location within a field of view associated with a promotion based on environment (e.g. metropolitan, rural, or the like). In another example, the relevance module 205 may identify at least one provider location in a field of view that is associated with a promotion is based on the location data and location data associated with an associated consumer (e.g. promotions for more than one person when there is at least one additional consumer in the area of the first consumer).

Example Map

Referring now to FIG. 3, an example map 300 is depicted, which may be a portion of a map data, in accordance with embodiments of the present invention. The map 300 may include a consumer device location data 302, one or more provider locations 304, and a proximity radius 306. The promotional system 102 or consumer device 114 may receive a location data 302 associated with a consumer device 114 from a location sensor, such as a global position system (GPS) sensor or proximity sensor, such as near field communication, bar code reader, Bluetooth® low energy, radio frequency identifier (RFID) reader, or the like. The consumer location data may include consumer proximity data from the proximity sensors. The promotional system 102 or consumer device 114 may receive a proximity radius based on consumer input, default values, historical consumer preference data, weather, environment, or the like. The promotional system 102 or the consumer device 114 may receive map data based on the location data and the proximity radius. The map data may include without limitation, a map of an area associated with the consumer device location data, provider locations 304 within the map area, promotion parameter data associated with each provider location.

In an example embodiment, the map data may include the location of associated consumers, derived from social media or other applications which incorporate location of members, friends, family, or the like. The promotional system 102 or consumer device 114 may access social media and/or other location applications through wireless communications to retrieve consumer profile data, associated consumer members profile data, associated consumer location data, or the like.

In an example embodiment, the location data associated with the consumer may be accumulated and used to provide consumer location information to providers. Consumer location information may be aggregated or otherwise processed to include the number of consumers which have walked by the provider location without entering, the number of consumers that did enter the provider location, time spent at the provider location, number of consumer that viewed the provider location, the number of consumers that purchased a promotion from the provider location, or the like.

Example Augmented Realities Displayed on a User Interface

FIGS. 4-10 illustrate augmented realities displayed on a user interface in accordance with an example embodiment of the present invention. The augmented reality may include a field of view 402, a provider location 404, an impression 406, a proximity radius indicator 408, and a search field 410. The field of view 402 may be a view of a real world environment based on camera data associated with a consumer device 114. In some embodiments, the camera data may include orientation data associated with the consumer device camera data. The orientation data may include the direction and/or angle the camera associated with the consumer device is pointing at the time the camera data is captured.

The provider location 404 may be overlaid on the field of view 402 indicating the locations of providers associated with a promotion. The provider location 404 may include a two dimensional or three dimensional icons or other indicator of the location of the provider within the field of view 402. In an example embodiment, the provider location 404 may be associated with a color or graphic indicating the type or category of goods or service provided by the provider, such as in FIG. 4. For example, food and drink graphic or red indicator, health and spa graphic or blue indicator, beauty graphic or green indicator, home and garden graphic or purple indicator, or the like. In an example embodiment, the provider location 404 includes a location on an x,y axis. For example, in an embodiment in which the provider location 404 is on an x,y axis, the provider location icon may indicate the relative direction of the provider location within the field of view 402, such as in FIGS. 5 and 8. Additionally or alternatively, the provider location 402 may include an elevation on a z axis, in an instance in which the map data includes topographical information or the provider is on a second or third floor of a building. In this example embodiment, the provider location 404 icon may be elevated or lowered within the field of view 402 to indicate the relative elevation of the provider location in comparison to the consumer device 114, such as in FIGS. 4, 6, 7, 9 and 10. A provider location 404 may be selected by a manually using a user interface, such as by a touch, gesture, consumer device motion, eye movement, or the like. In an example embodiment, the selection of the provider location may be made based on the orientation of the consumer device camera data, such as selecting the provider location that is closest to the center of the field of view 402. Additionally or alternatively, the provider location may be selected automatically such as by scrolling through provider locations within the field of view 402 left to right or right to left, based on relevance, or the like.

Figure 5:
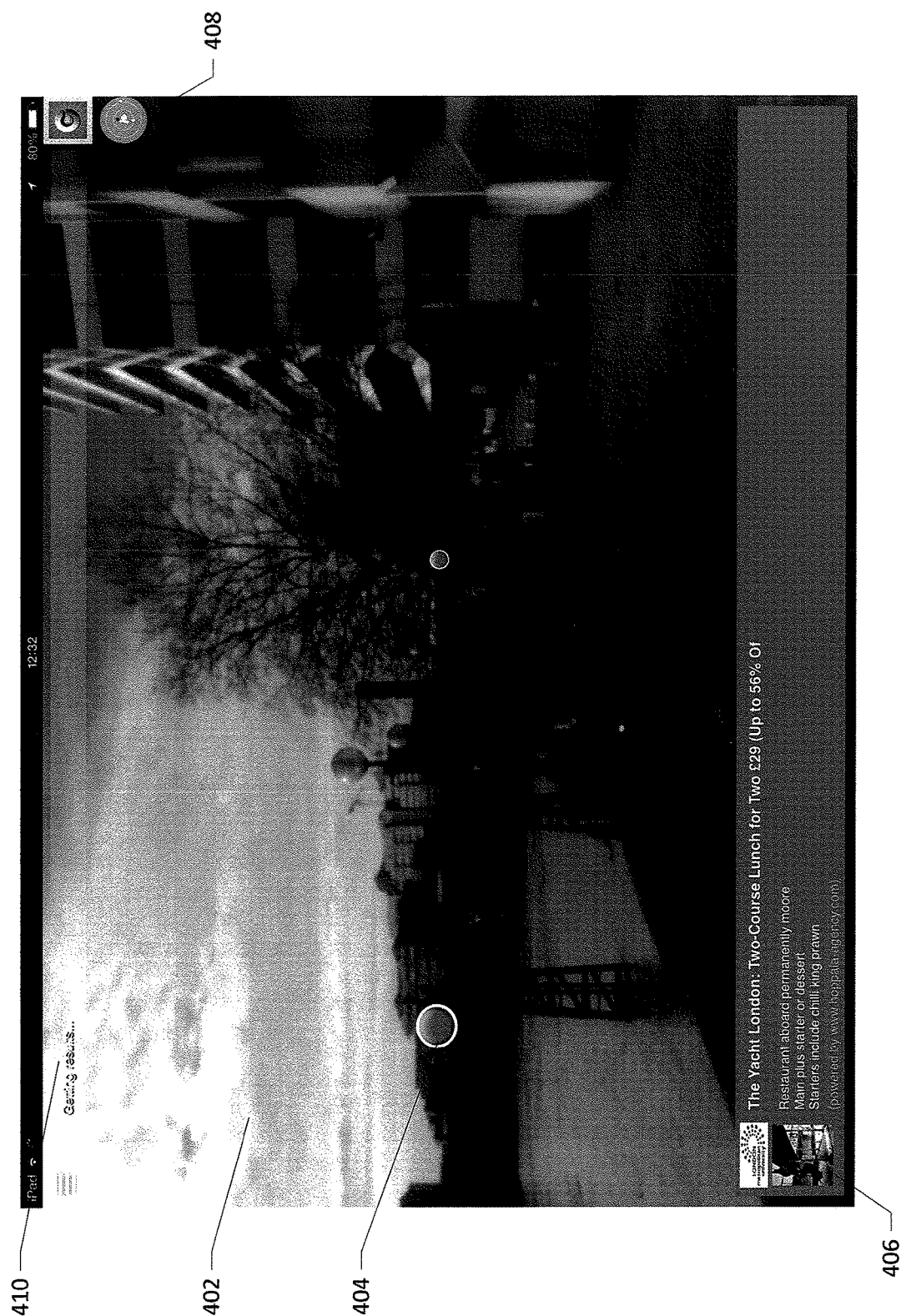
Figure 6:
Figure 7:
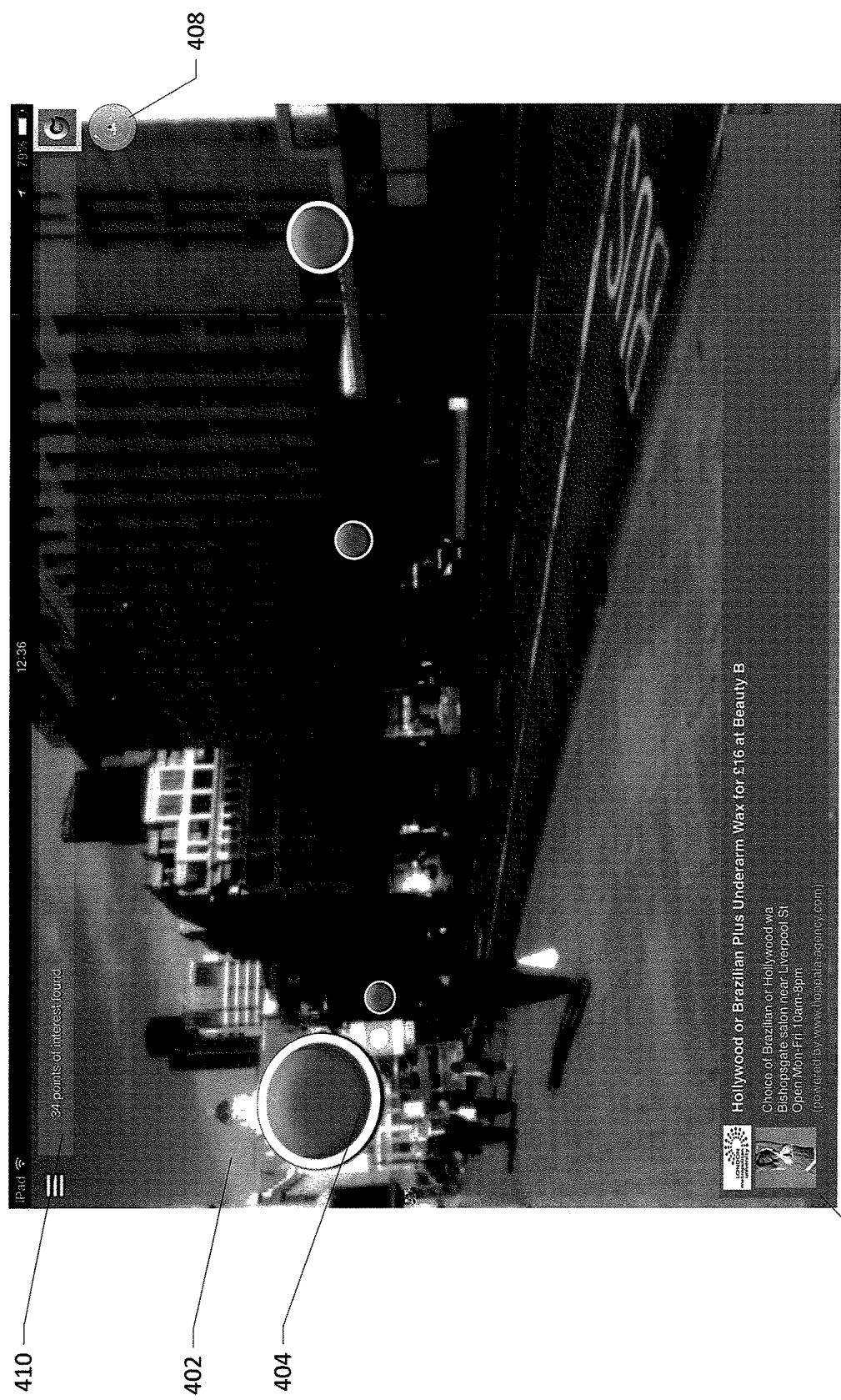
Figure 8:
Figure 9:
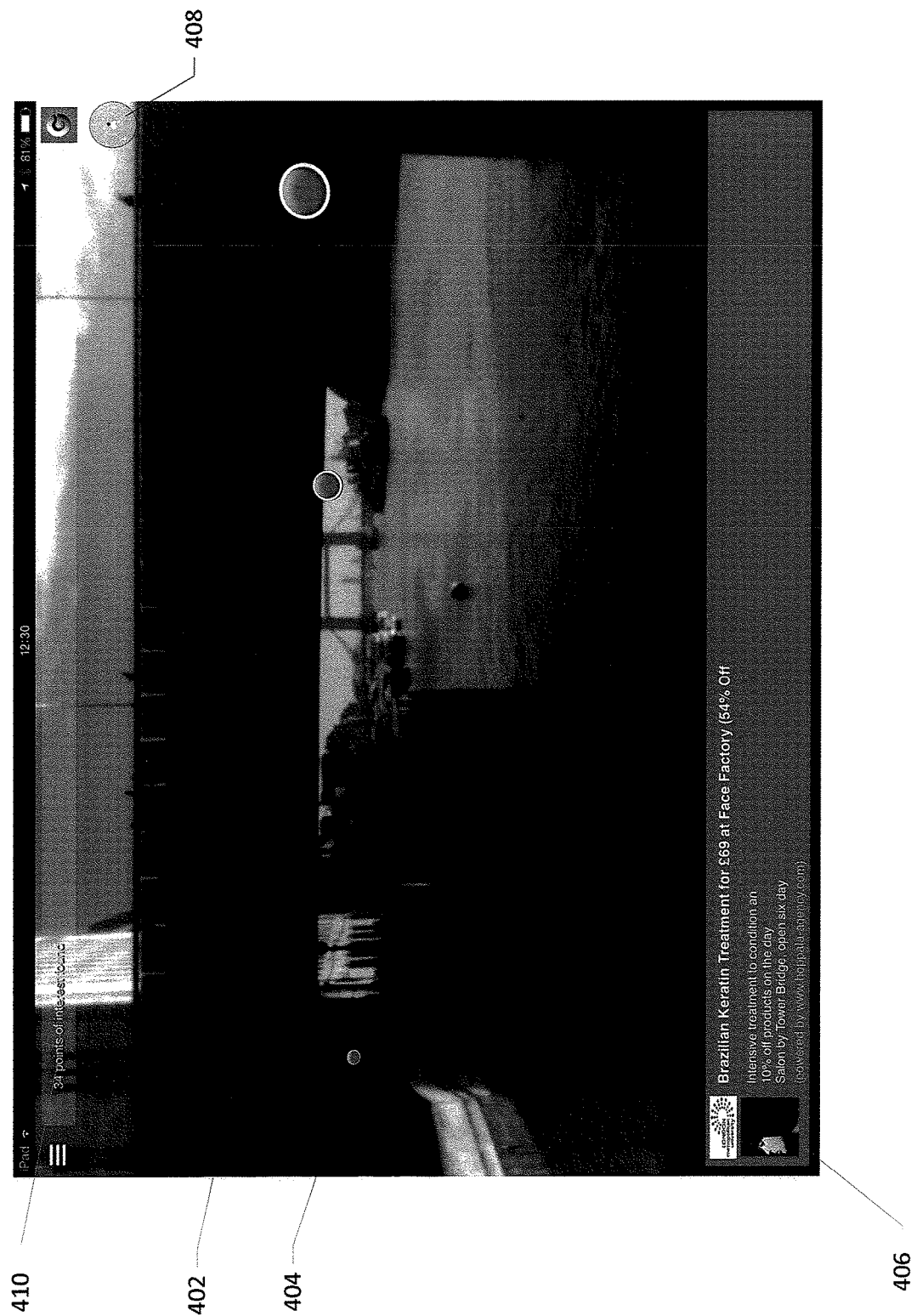
Figure 10:
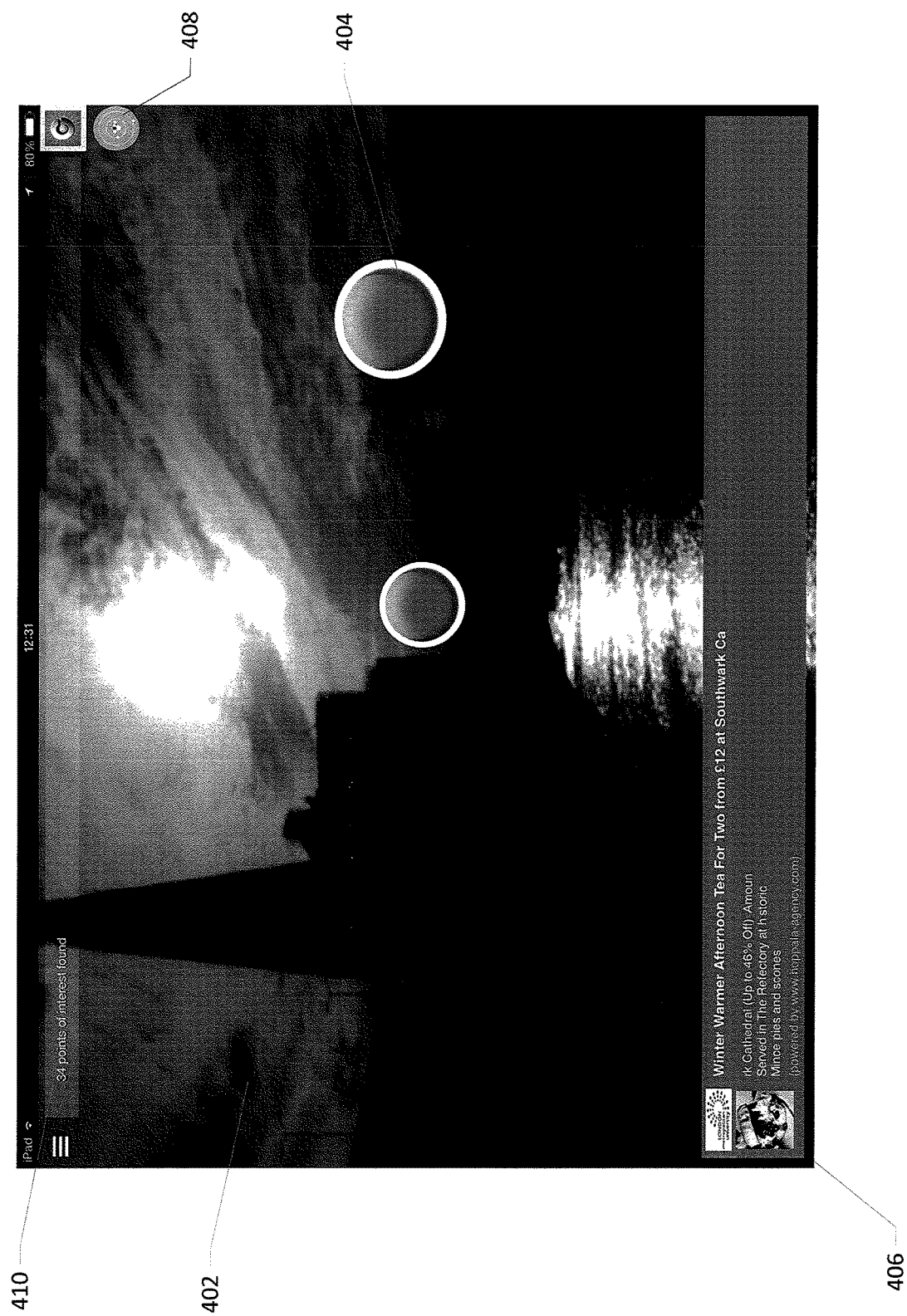

In an example embodiment, the size of the provider location icon may be based on the proximity of the provider location relative to the consumer device 114 location, for example the provider location icon may be larger the closer the provider location 304 is to the consumer device location 302, such as in FIGS. 5, 6, and 8. In another example embodiment, the size of the provider location icon may be based on the selection of a provider location 404 or the next or previously viewed or selected provider location, such as in FIG. 7. In another example embodiment, the size of the provider location icon may be based on the relevance of the promotion associated with the provider location 404. For example, if the promotion associated with the provider location 404 has a higher relevance it will be larger than provider location icons associated with a lower relevance, such as in FIGS. 9 and 10.

The augmented reality may include an impression 406 which includes at least a portion of the promotion parameters. The impression 406 may be displayed as a default impression based on a provider paying a premium, based on relevance such as the highest relevance promotion, or based on the selection of a provider location, as discussed above. In some embodiments, the impression 406 may include video data. For example, a promotion for a spa treatment may include a video impression to further entice the consumer to purchase the promotion, such as views of a message, facial, hot tub, or the like. The impression 406 may include a promotion parameters summary including the provider name, brief description of the promotion, and the price or savings. For example, the impression may include Amigo's Tea, Tea for four, starting at $21. In some example embodiments, the promotion parameters summary may include a time period, end time, or time remaining for the promotion. The consumer may purchase or book the promotion from the impression 406, in the form of an instrument, or select the impression 406 to provide more detailed promotion parameters. In some examples, selection of the promotion parameter summary impression 406 may prompt a display of a purchase or details option which may be selected. The consumer may select the impression 406 of the promotion parameters summary, using the user interface by a touch, gesture, consumer device motion, eye motion, or the like. The selection of a promotion parameters summary impression may cause a full promotion parameters impression to be displayed from which the promotion may be purchased or booked, in the form of an instrument.

In an example embodiment, the impression 406 in the augmented reality may include or be associated with pictures reviews, posts, or the like from consumers that have purchased the promotion (e.g., from social media, from review sites, from review publications, and/or the like). The reviews, pictures, posts, or the like may be input by a consumer into a database such as the promotional database 106 and presented as a portion of the impression.

The augmented reality may include a proximity radius indicator 408. The proximity radius indicator 408 may indicate the relative provider locations 404 in comparison to the location of the consumer device 114 or consumer device location 302. The proximity radius indicator 408 may also indicate the provider locations 404 within the field of view 402 by highlighting the provider locations or area of the proximity radius indicator that is within the field of view.

In an example embodiment, the consumer device location 302 may include a consumer proximity data. The augmented reality 402 may display a promotion when the consumer, as identified by the location data, the consumer proximity data or the like, is within a specified proximity position. For example, the augmented reality 402 may display a promotion when the consumer proximity data is within the proximity position of the entry to a provider location 404. In another example, the augmented reality may display a promotion when the consumer proximity data is within the proximity position of the cash register or other check out area at a provider location 404.

The augmented reality may include a search field 410. A "search" may include operations performed by a consumer or other user via a client device, wherein text, parameters, tags, or other terms are searched against one or more electronically stored documents, data entries, records, files, or the like. In some embodiments, a "search" may be performed by navigating a hierarchical data structure, such as a data structure organized by location/hyper-location or category/sub-category. In some embodiments, portions of a search string may be pre-populated (e.g., a location or hyper-location portion) by the client device or other processing circuitry. In some embodiments, a search may be performed using a single field or any array of fields.

The search may be executed by a "search system" running on the client device, which may include a search engine configured to search for information on the World Wide Web (www) or on a remote server. In some embodiments, the "search engine" may be configured to search for information hosted via a website or a web server of an application, and to provide "search results." "Search results" may be transmitted or otherwise provided for display to the consumer or other user via the client device as a list of information (e.g., list of web pages, images or the like) related to the search. The search system may be configured such that particular promotions may be offered to consumers based on relevance determinations. For example, U.S. patent application Ser. No. 13/829,581, which is entitled "Promotional system", was filed Mar. 14, 2013, and which is hereby incorporated by reference in its entirety, algorithms are disclosed for providing consumers relevant promotions in response to consumer initiated searches.

"Consumer search data" may include one or more search terms (e.g., text, characters, etc.) that are input by consumers into an interface (e.g., one or more fields displayed by a graphical user interface) of the search system. The consumer search data is used by the search system, perhaps in connection with other data or terms (e.g., pre-populated data, categories, etc.), to execute the search. In some embodiments, consumer search data is stored with an association to consumer identification information (e.g., a consumer ID).

Consumer search data may be translated or otherwise identified by the search system as "searched attributes". "Searched attributes" may be parts of a promotion to which the consumer search data is translated or converted to. For example, if a consumer searches "Chinese restaurant", "Chinese restaurant" may be the consumer search data. Embodiments of the present invention may store a "searched attribute" for one or more of a category (e.g., "food and drink"), a sub-category (e.g., "Asian cuisine"), a deal type (e.g., "date night") or the like. In some embodiments, translation to "searched attributes" is performed in the case of misspellings (e.g., "Chinese restaurant"), partial input (e.g., "Chinese rest."), or the like.

Consumer search data may further include sorting functions including without limitation, popularity, alphabetical, price, time remaining for promotions, distance from a predetermined location such as home, distance form current location, zip code, or the like.

The consumer may input consumer search data into the search field 410 to narrow the provider locations displayed or which provider locations are displayed. In an example embodiment, the search field may include a search field menu which may allow the consumer to enter consumer preferences such as categories of promotions to display or not display, proximity radius, method of travel, promotion times, number of people in a group, or the like. The search field may alternatively or additionally include a search field menu which may allow the consumer to enter consumer information that may include gender, age, interests, marital status, number of children and ages, or the like. The inputs into the search field may be used to determine the relevance of each of the available provider locations, and then identify and display a subset of the available provider locations associated with a promotion.

In an example embodiment, the search field 410 may indicate the status of identifying provider locations associated with a promotion, such as in FIG. 5. In another example the search field 410 may indicate the number of provider locations associated with a promotion found and/or displayed, such as in FIGS. 6-10

Figure 11:

In an example embodiment, the augmented reality may be configured to visibly display the field of view 402 at night or in low visibility such as fog. In an example, the augmented reality may supplement the camera data field of view with infra-red image providing an overlay of the field of view that is visible at night or in low visibility, as depicted in FIG. 11. In another example, the augmented reality may supplement or substitute the field of view 402 with a stored image of the field of view from a database, such as Google Street View® based on the consumer device 114 location and camera orientation. In some examples, a visibility supplementation of the augmented reality may be based on a consumer device or universal clock indication of dusk at the current location associated with the consumer device. In another example, the visibility supplementation may be based on a user input of low visibility. In another example, the visibility supplementation may be based on weather data associated with the current location of the consumer device In an example embodiment, the field of view 402 of the augmented reality may lock to allow consumer interaction with the field of view in positions other than the camera data capture position. The field of view may lock automatically for a predetermined duration or by be locked and unlocked by consumer input. For example, if the consumer captures a camera data field of view 402 with an arm raised it may be uncomfortable to interact with the displayed view and promotions while maintaining this position and/or camera orientation. The field of view may be locked allowing the consumer to lower the consumer device and interact with the augmented reality, regardless of the camera orientation.

In an example embodiment, other incentives (e.g., points, gifts, credits, discounts, or the like) may be included within the displayed augmented reality 402. For example, in some cases an incentive may be provided to a user in an instance in which the consumer views a specific promotion, views a particular number of promotions, accesses a clue associated with a promotion having a predetermined point value (e.g., consumer may use the augmented reality 402 to search and view the promotion associated with the clue to gain the incentive points), and/or the like.

In an example embodiment, the augment reality 402 displays accumulated savings for a group of promotions. For example, as the consumer selects promotions, and in some examples purchases the promotions, a savings counter may be displayed within the augmented reality 402 highlighting the savings attained for one or more selected promotions. In further examples, by capturing the savings for one or more selected promotions, additional savings may be applied once a savings threshold is satisfied, a particular number of promotions has been purchased and/or the like.

In an example embodiment, the augmented reality 402 may facilitate communication with the promotion and marketing service, help desk, a particular provider, or the like. To facilitate the communication, the augmented reality 402 may display a contact link to cause video, audio, or text communications between the consumer and the provider, the promotion and marketing service, help desk, or the like. For example, in an instance in which the promotion purchase fails, a promotion is booked for the incorrect time, the consumer desires to transfer the promotion to another consumer, or the like, the consumer may desire to contact the provider, the promotion and marketing service, help desk, or the like.

In an example embodiment, an augmented reality may be generated in response to an augmented reality cue associated with provider webpages, advertisements (e.g. billboards, newspaper, magazine, fliers, business cards, or the like), emails, or the like may include one or more augmented reality cues. Augmented reality cues may be a QR codes, internet links, or other dedicated interactive stimuli. In an instance in which the augmented reality cue is read, scanned, selected, or otherwise interacted with, the consumer device may generate an augmented reality based on the augmented reality cue. The augmented reality based on the augmented reality cue may display a provider location within a field of view associated with a promotion which is, in turn, associated with the provider originating the augmented reality cue.

In an example embodiment, augmented reality cues could be embedded into promotions on promotion and marketing service websites. For example, a promotion impression, provider review, promotion review, goods or service review, or the like may include the augmented reality cue. A consumer device may scan, read, select, or otherwise interact with the augmented reality cue to generate an augmented reality displaying a provider location within a field of view associated with a promotion adding further context to the review, provider, promotion, or the like.

Example Process for Generation of Promotion in an Augmented Reality

Referring now to FIG. 12, the operations performed, such as by the apparatus 200 of FIG. 2, for generation of a promotion in an augmented reality are illustrated. As shown in block 1202 of FIG. 12, the apparatus may include means, such as an augmented reality module 209, processor 202, communications interface 206, or the like, for receiving camera data.

In some examples, the augmented reality module 209 may be configured to cause the processor 202 to receive camera data from a camera associated with the consumer device 114. In an example embodiment the camera data may include orientation data associated with the consumer device 114, for example the direction and/or angle the camera is pointed during the capture of the camera data. The processor 202 may receive the camera data from the communications interface 206 or from the camera associated with the consumer device 114.

As shown in block 1204 of FIG. 12, the apparatus 200 may include means, such as an augmented reality module 209, processor 202, communications interface 206, or the like, for receiving location data. The location data may be generated by a location sensor, such as a global position sensor or other method of determining position, which is associated with the consumer device 114. The location data may be associated with the camera data that is received at block 1202.

As shown in Block 1206 of FIG. 12, the apparatus 200 may include means, such as a processor 202, communications interface 206 or the like for receiving map data. The map data may include a two dimensional or three dimensional representation of an area based on the location data. The area of the map data may be based on a default radius around the consumer device 114 location, a consumer input radius, environment, weather, or the like. In an example embodiment, the radius may adjust based on the environment or a selected mode of travel. For example in an instance in which the user device location is in a metropolitan area or the method of travel selected is walking, a smaller radius may be set. In an instance in which the environment is a small town or rural area or the method of travel selected is motorized, the radius may be larger. The map data may include, without limitation, the consumer device location 302, provider locations 304 associated with a current promotion, topographical data, or the like.

As shown in block 1208 of FIG. 12, the apparatus 200 may include means, such as an augmented reality module 209, relevance module 205, processor 202, or the like, for identifying at least one provider location within a field of view 402 associated with a promotion. The augmented reality module 209 may be configured, in conjunction with the relevance module 205, to cause the processor 202 to identify all or a sub-set of the provider locations associated with a promotion provided in the map data. The augmented reality module 209, relevance module 205, processor 202, or the like may identify the subset of provider locations based on relevance criteria, such as predetermined number of consumer devices 114 within a proximity radius of a consumer device, a real time provider notice, a predetermined number of consumers associated with a user equipment, consumer attribute from a consumer profile, consumer search data, consumer preferences, consumer input, a consumer input proximity radius, promotion times, number of views of the promotion or provider location, weather, environment, or the like.

The augmented reality module 209 and/or the relevance module 205 may cause the processor 202 to use one or more of the relevance criteria to identify at least one provider location within a field of view 402 associated with a promotion. The augmented reality module 209 and/or the relevance module 205 may cause the processor 202 to identify a first relevance ranking of promotions, and further or second relevance rankings of promotion to narrow the identified provider locations. Additional examples of methods for identifying provider locations associated with a promotion based on relevance criteria are provided in FIG. 12.

As shown in block 1210 of FIG. 12, the apparatus 200 may include means, such as an augmented reality module 209, a processor 202, or the like for generating an augmented reality. The augmented reality module 209 may be configured to cause the processor 202 to generate an augmented reality. Augmented reality, when displayed on a user interface may include a field of view 402 (as shown in FIGS. 4-10), a provider location 404, an impression 406, a proximity radius indicator 408, and a search field 410. The field of view 402 may be a view of a real world environment based on camera data associated with a consumer device 114. In some embodiments, the camera data may include orientation data associated with the consumer device camera data.

The provider location 404 may be overlaid on the field of view 402 indicating the locations of providers associated with a current promotion. The provider location 404 may include an icon or other indicator of the location of the provider within the field of view 402. In an example embodiment, the provider location 404 may be associated with a color or graphic indicating the type or category of goods or service provided by the provider. For example, in some examples a food and drink graphic or red indicator may be shown, whereas in other examples other categories may use other indicator, such as a health and spa graphic or blue indicator, beauty graphic or green indicator, home and garden graphic or purple indicator, or the like. In an example embodiment, the provider location 404 include a location on an x,y axis. For example in an embodiment in which the provider location 404 is on an x,y axis the provider location icon may indicate the relative direction of the provider location within the field of view. Additionally or alternatively, the provider location 402 may include an elevation on a z axis, in an instance in which the map data includes topographical information or the provider is on a second or third floor of a building. In this example embodiment the provider location 404 icon may be elevated or lowered within the field of view 402 to indicate the relative elevation of the provider location in comparison to the consumer device 114.

In an example embodiment, the size of the provider location icon may be based on the proximity of the provider location 304 relative to the consumer device location 302, for example the provider location icon may be larger the closer the provider location is to the consumer device location. In example embodiments, the size provider location icon may be based on the selection of a provider location, the next or previously viewed or selected provider location, the relevance of the promotion associated with the provider location, the distance from the consumer location, or the like. For example, if the promotion associated with the provider location has a higher relevance it will be larger than provider location icons associated with a lower relevance.

The proximity radius indicator 408 may indicate the relative provider locations 404 in comparison to the location of the consumer device 114. The proximity radius indicator 408 may also indicate the provider locations 404 within the field of view 402 by highlighting the provider locations or area of the proximity radius indicator that is within the field of view.

The consumer may input consumer search data into the search field 410 to further narrow the provider locations displayed or which provider locations are displayed. In an example embodiment, the search field 410 may include a search field menu which may allow the consumer to enter consumer preferences, and other consumer information. Consumer preferences may include categories of promotions to display or not display, proximity radius, method of travel, promotion times, number of people in a group, or the like. Consumer information may include gender, age, interests, marital or relationship status, number of children and ages, or the like. The inputs into the search field may be used to determine the relevance of each of the available provider locations, and then identify and display a subset of the available provider locations associated with a current promotion.

As shown in block 1212 of FIG. 12, the apparatus may include means, such as an augmented reality module 209, a processor 202, a communications interface 206, a user interface 208, or the like, for causing the display of the augmented reality on a user interface. The augmented reality module 209 may be configured to cause the processor 202 to cause the augmented reality to be displayed on a user interface 209. In an example embodiment, the augmented reality module 209 may cause the processor 202 to cause the communications module 206 to transmit the augmented reality to a consumer device 114 for display on the consumer device user interface. Example augmented realities are shown displayed on a user interface depicted in FIGS. 4-10.

As shown in block 1214 of FIG. 12, the apparatus 200 may include means such as an augmented reality module 209, a processor 202, a user interface 208, or the like for receiving a provider location selection indication. A provider location 404 may be selected by manually using a user interface 208, such as by a touch, gesture, consumer device motion, eye movement, or the like, of a consumer. In an example embodiment, the selection of the provider location 404 may be made based on the orientation of the consumer device camera data, such as selecting the provider location that is closest to the center of the field of view.

Additionally or alternatively, the provider location 404 may be selected automatically such as by scrolling through provider locations within the field of view left to right or right to left, based on relevance, or the like. The augmented reality module 209 may cause the processor 202 to receive the provider location selection indication from the user interface 208 or the communications interface 206. In an example embodiment in which the provider location selection indication is received from the communications interface 208, the communications interface 208 may receive the provider location selection indication from the consumer device 114 through wireless communication.

As shown in block 1216 of FIG. 12, the apparatus 200 may include means, such as an augmented reality module 209, a processor 202, a user interface 208, a communications interface 206, or the like for causing the display of an impression 406 including at least a portion of promotion parameters. The impression 406 may be displayed as a default impression based on a provider paying a premium, based on relevance such as the highest relevance promotion, or based on the selection of a provider location, as discussed above. The impression 406 may include a promotion parameters summary including the provider name, brief description of the promotion, and the price or savings. For example, the impression may include Amigo's Tea, Tea for four, starting at $21. In some example embodiments, the promotion parameters summary may include a time period, end time, or time remaining for the promotion. A consumer may purchase or book a promotion, in the form of an instrument, from the promotion parameter summary impression 406 or select the impression to display further promotion parameters or details as discussed in blocks 1218 and 1220.

As shown in block 1218 of FIG. 12, the apparatus 200 may include means, such as an augmented reality module 209, a processor 202, a user interface 208, a communications interface 206, or the like for receiving a promotion parameter summary selection indication. The consumer may select the impression 406 of the promotion parameters summary, using the user interface 208 of the consumer device 114 by a touch, gesture, consumer device motion, eye motion, or the like. The augmented reality module 209 may be configured to cause the processor 202 to receive the promotion parameter summary selection indication. The processor 202 may receive the promotion parameter summary selection indication from the user interface 206 or the communications interface 206. The communications interface 206 may receive the promotion parameter summary indication from a consumer device 114 through wireless communication.

As shown in block 1220 of FIG. 12, the apparatus 200 may include means, such as an augmented reality module 209, a processor 202, a user interface 208, a communications module 206, or the like for causing the display of an impression including the promotion parameters. The augmented reality module 209 may be configured to cause the processor 202 to cause the display of an impression which includes all of the promotion parameters on the user interface 208, from which the consumer may purchase or book the promotion, in the form of an instrument. In an example embodiment, the processor 202 may cause the communications interface 208 to transmit the impression including the promotion parameters to the consumer device 114 for display on a user interface 208.

In an example embodiment, receiving a promotion parameter summary indication may cause the augmented reality module 209 to cause the processor 202 to display a purchase now or further details prompt. In an instance in which the consumer selects the further details prompt, the processor may display an impression as described in block 1220 otherwise the consumer may purchase the promotion at block 1216.

Example Process for Identifying Provider Locations Associated with a Current Promotion Based on Relevance FIG. 13 shows an example process that may, in some embodiments, be executed by an example augmented reality module 209 and/or a relevance module 205 in association with a processor 202. The exemplary process shown below in FIG. 13 allows various embodiments of the present invention to identify promotion locations within a field of view associated with a promotion that are relevant to a particular consumer. In other words, FIG. 13 shows a general process for identifying relevant promotions and provider locations for outputting to, for example, a consumer via an augmented reality.

In general, relevance may include an analysis to determine which promotion(s) to offer to the consumer for a product or a service. In some embodiments, a relevance system may be configured for determining which of a plurality of promotions to present to a consumer. The plurality of promotions may be for goods and/or for services. The promotion may be offer as an impression through an augmented reality as discussed above.

In order for the relevance module 205 to identify the one or more promotions for the augmented reality, the relevance module 205 may determine whether to offer particular promotion(s) to a targeted consumer, by identifying the provider locations 404 associated with the promotions. As such, as shown in block 1302 of FIG. 13, an apparatus 200 may include means, such as a relevance module 205, an augmented reality module 209, a processor 202, or the like for generating a first ranking of promotions for presentation to a consumer. In some embodiments, each of the promotions is associated with promotion parameters. In some embodiments, the first ranking may be generated based on correlating a first relevance criteria to the promotion parameters of each of the promotions. The relevance criteria may include without limitation, a predetermined number of consumer devices 114 within a proximity radius of a consumer device, consumer proximity data, a real time provider notice, start and end time of a promotion, a predetermined number of consumer devices within a proximity radius of a provider location, a predetermined number of consumers associated with a user equipment, consumer attributes from a consumer profile, consumer search data, consumer preferences, consumer input, a consumer input proximity radius, promotion times, number of views of the promotion or provider location, weather, environment, such as rural or metropolitan, or the like.

In an example embodiment, the relevance module 205, an augmented reality module 209, a processor 202, or the like may use one or more of the relevance criteria to generate a first ranking of promotions. In an example embodiment, the relevance module 205, an augmented reality module 209, a processor 202, or the like may use the number of consumers associated with a consumer device or proximate consumer indication to generate the first ranking of promotions. The number of consumers associated with the consumer device may be based on a consumer input such as a group number. The relevance module 205, an augmented reality module 209, a processor 202, or the like may provide promotions for which the promotion parameters are conducive to multiple consumers, such as dinner for two, tea for four, buy two get one free. The relevance module 205, an augmented reality module 209, a processor 202, or the like may also generate a first ranking of promotions in which the promotion parameters of the promotions are specified for a single consumer, but there are multiple available appointments or slots, such as haircut for $10 with four available times. The processor 202 may exclude promotions which are for groups smaller than the number of consumers associated with the consumer device 114.

In another example, the number of consumers associated with a consumer device may be based on a proximate consumer indication. A proximate indication is an indication that is received by the consumer device 114 that there is a second consumer associated with a second consumer device near the consumer. The apparatus 200 may include means, such as an augmented reality module 209, processor 202, communications interface 206, or the like for receiving a proximate consumer indication. The proximate consumer indication may be a wireless communication, such as Wi-Fi, Bluetooth low energy (BLE), near field communication (NFC), or the like indicating a second consumer device 114 associated with the first consumer device is present within a predetermined proximity range. For example, the first and second consumer devices 114 may be configured to communicate an association based on a relationship when specified applications are executed on the consumer device or whenever the consumer devices are in proximity, or upon a consumer request to associate. Some example relationships may include, without limitation, parents and children, spouses, friends, co-workers, or the like. The augmented reality module 209 may be configured to cause the processor 202 to receive the proximate consumer indication from the communications interface 206. The communications interface 206 may receive the proximate consumer indication from the second consumer device 114 or from the first consumer device through wireless communication.

In an example embodiment, the relevance module 205, an augmented reality module 209, a processor 202, or the like may use other consumer location data to generate the first ranking of promotions. The relevance module 205, an augmented reality module 209, a processor 202, or the like may use the locations of associated consumers derived from social media or other friend or family location applications. The relevance module 205, an augmented reality module 209, a processor 202, or the like may generate a first ranking of promotions in which the promotion parameters of the promotions include a consumer and/or one or more of the associated consumers, such as the consumer and one associated consumer. The relevance module 205, an augmented reality module 209, a processor 202, or the like may not provide promotions which the promotion parameters include a group larger than the total number of associated consumers and the consumer. For example, if there are three associated consumers, the provided promotions may include promotions for 1-4 consumers, but not promotions for 5 or more consumers.

In an example embodiment the relevance criteria may be a real time provider notice. The relevance module 205, an augmented reality module 209, a processor 202, or the like may generate a first ranking of promotions based on the real time provider notice. A provider may have a slow period of business and provide a real time notice that consumers may receive a promotion within a short specified time period. For example, a provider may provide a real time notice for a late lunch special 50% off at 3 in the afternoon, within a one hour duration. The relevance module 205, an augmented reality module 209, a processor 202, or the like may provide the promotion during the promotion period.

In an example embodiment, the relevance criteria may be a consumer attribute from a consumer profile. The consumer profile may be stored in a memory 204 such as the consumer profile database 108. The relevance module 205, an augmented reality module 209, a processor 202, or the like may receive the consumer attribute from the memory 204. The processor 202 may use the consumer parameter to generate a first ranking of promotions. The consumer profile parameters may include, gender, age, race, group affiliations, relationships with other consumers, purchase history, historical location data, such as locations visited and routes taken, preferences, important dates, such as anniversaries and birthdays, or the like. The processor 202 may use one or more of the consumer attributes to generate the first ranking list. For example, the relevance module 205, an augmented reality module 209, a processor 202, or the like may use an important data, such as a birthday of a spouse and historical location data, to provide promotions for gifts or services that could be used as a birthday present, such as flowers for half off, jewelry, or the like. In another example, the relevance module 205, an augmented reality module 209, a processor 202, or the like may use purchase history to provide promotions similar to promotions including products or services that the consumer has previously purchased or promotions with larger discounts to reward or entice previous and future purchases associated with provider. In another example, the relevance module 205, an augmented reality module 209, a processor 202, or the like may use a consumer attribute such as relationship data, for example, married or in a relationship to provide promotions that may be more desirable to a couple and not provide promotions that may be more desirable to a single person. For example, if the relationship parameters indicated that the consumer was married, the provided promotions may include promotions for romantic activities or couples activities such as dinners, events, or the like for couples. In the same example, the provided promotion may not include promotions targeted for singles, such as discounted drinks at a singles bar, or dating services.

In an example embodiment, the processor 202 may determine the consumer profile based on biometric data received from the consumer device. The bio metric data may identify a consumer or associated consumer and the generating a ranking of promotions may be based one or more consumer attributes of the consumer, associated consumer, or both. Biometric data may include fingerprints or iris scans from a camera associated with the consumer device, voice recognition from a microphone associated with the device, or the like. Using biometric data to identify the consumer and/or associated consumers allows the consumers to forgo manual logging in to the promotional system 102.

In an example embodiment, the relevance criteria may be a consumer preference. The relevance module 205, an augmented reality module 209, a processor 202, or the like may receive the consumer preference from a user interface 208, a memory 204, a communications interface 206, or the like. The consumer preferences may be entered by a consumer using the user interface 208 or determined based on previous purchases. The consumer preferences may be stored in a memory 204, such as a consumer profile database. The communications interface 206 may receive the consumer preferences from a consumer device 114 through wireless communication. The relevance module 205, an augmented reality module 209, a processor 202, or the like may generate a first ranking of promotions based on the consumer preferences to provide promotions in which a promotion parameter is preferred and exclude promotions in which a promotion parameter is not preferred. For example, the consumer preference may indicate that the consumer prefers Chinese food and does not prefer fast food; the provided promotions may include Chinese and other restaurants, but not include fast food restaurants.

In an example embodiment, the relevance criteria may be consumer search data. The consumer may enter search data using a user interface 208. The relevance module 205, an augmented reality module 209, a processor 202, or the like may receive the consumer search data from the user interface 208. The processor 202 may use the consumer search data to generate a first ranking of promotions. The consumer search data may be any input into the search field 410. For example, the consumer may enter into the search field 410 on the user interface 208, "pizza". The relevance module 205, an augmented reality module 209, a processor 202, or the like may provide promotions in which a promotion parameter is pizza or the provider location is associated with pizza. Further, the relevance module 205, an augmented reality module 209, a processor 202, or the like may return results for when the consumer search data is misspelled, abbreviated, or is a partial entry. For example, the processor may provide promotions for "pizza" when the entered search criteria is "pissa", "pitza", "pizz" or "pizara".

In an example embodiment, the relevance criteria may be consumer input. The consumer input may be received by a user input 208. The relevance module 205, an augmented reality module 209, a processor 202, or the like may receive the consumer input from the user interface 208. The relevance module 205, an augmented reality module 209, a processor 202, or the like may generate a first ranking of promotions based on the consumer input. Consumer input may be method of travel, time of day, day of the week, date, or the like in which the consumer wants to participate in a promotion. For example, the consumer may want to eat dinner at 6 pm. The relevance module 205, an augmented reality module 209, a processor 202, or the like may exclude promotions from the first ranking list that end prior to 6 pm and/or start after 7 pm. In an example in which the consumer input is method of travel, the processor may adjust the proximity radius for promotions. For example, if the consumer is walking, there may be a smaller radius than if the consumer was driving. In an example embodiment in which the consumer does not specify an alternative time or date, the relevance module 205, an augmented reality module 209, a processor 202, or the like may use the current time and date and provide promotions which are currently available. In another example, the consumer input may be a wish list. For example, the consumer may input promotions, goods, services or the like that they are interested in purchasing. The wish list may include promotions, goods, services, or the like for which a promotion is currently offered, or a promotion may be offered in the future. The relevance module 205, an augmented reality module 209, a processor 202, or the like may use the wish list consumer input and provide promotions when they become available.

In an example embodiment, the relevance criteria may be a consumer input proximity radius. The consumer input proximity radius may be received by a user interface 208. The relevance module 205, an augmented reality module 209, a processor 202, or the like may receive the consumer input proximity radius from the user interface 208. The relevance module 205, an augmented reality module 209, a processor 202, or the like may generate a first ranking of promotions based on the consumer input proximity radius. For example, the consumer may input a proximity radius of ¼ mile, 1 mile, 10, miles or any other radial distance. The relevance module 205, an augmented reality module 209, a processor 202, or the like may provide promotions that have provider locations within the proximity radius.

In an example embodiment, the relevance criteria may further comprise consumer proximity data. The consumer proximity data may be received by the communications interface 206. The relevance module 205, an augmented reality module 209, a processor 202, or the like may receive the consumer proximity data from the communications interface 206. The relevance module 205, an augmented reality module 209, a processor 202, or the like may generate a first ranking of promotions based on the consumer proximity data. The relevance module 205, an augmented reality module 209, a processor 202, or the like may provide promotions when the consumer proximity data is within a specified proximity position. For example, a promotion may be provided when the consumer proximity data is within the proximity position of the entry to a provider location 404. In another example, a promotion may be provided when the consumer proximity data is within the proximity position of the cash register or other check out area.

In an example embodiment, the relevance criteria may be promotion times. The relevance module 205, an augmented reality module 209, a processor 202, or the like may use the promotion start and end times to generate a first ranking of promotions. For example, the processor may only provide promotions that are currently available or will be available in a short period of time, and exclude promotions that have expired or have not started yet or will not start within a short period of time. For example the processor may provide reservations at restaurants, hairstylists, spas, or the like available now or within the next hour. In another embodiment, the processor may also use consumer input such as a date and/or time to generate a ranking of promotions. For example, the consumer may input a Feb. 1, 2014 at 12 PM. The relevance module 205, an augmented reality module 209, a processor 202, or the like may provide promotions that are available during that time and date, e.g. start and end time of the promotion or near that time or date. For example, if the consumer entered a time/date of February 5 at 6 pm, the relevance module 205, an augmented reality module 209, a processor 202, or the like may provide promotions for dinner, events, activities or the like available at 5, 6 or 7 PM. In another example embodiment the time and date may be a range to time and/or dates, such as February 1-3; 5-7 PM. The processor may provide promotions for which the promotion parameters include start or end times occurring within the range of dates and/or times.

In an example embodiment, the relevance criteria may be a predetermined number of consumer devices within a proximity radius of a provider location. For example, a provider may limit a promotion to times that have higher traffic or lower traffic, which may be indicated by the number of consumer devices in the proximity radius of a provider location. In an example embodiment, the promotion is available when the number of consumer devices satisfies a predetermined number. For example, if the predetermined number of consumer device s 114 is set to 5, such as at a low traffic time, in an instance in which there were only 4 consumer devices within the proximity radius of the provider location the predetermined number would be satisfied and the promotion would be available.

In an example embodiment, the relevance criteria may be the number of views of a promotion or provider location. The relevance module 205, an augmented reality module 209, a processor 202, or the like may use the number of views of the promotion or provider location to generate the first ranking of promotions. In an example embodiment, the promotion may have a parameter to display the promotion a predetermined number of times, such as one, two, three or any other number of views. The relevance module 205, an augmented reality module 209, a processor 202, or the like may provide promotions that have not exceeded the number of views. For example the provider may offer a larger discount for first time clients or first view of the promotion or promotions associated with a provider location. In an example embodiment, the promotion may have a parameter which allows the display of a promotion after a predetermined number of views of an associated promotion or provider location. The promotion may be displayed if a consumer has viewed an associated promotion or provider location and not purchased or booked a promotion a predetermined number of times, such as two, three or any other number of views, indicating that the consumer may be interested in the promotion at a lower price. For example, if a consumer has viewed a promotion twice without purchase or booking, an associated promotion may be displayed with a lower price or alternative goods or services.

In an example embodiment, the relevance criteria may be weather. The weather may be received by the relevance module 205, an augmented reality module 209, a processor 202, or the like from a weather database or entered by the consumer using the user interface 208. The relevance module 205, an augmented reality module 209, a processor 202, or the like may use the weather to generate a first ranking of promotions. The weather may include the temperature, humidity, precipitation, cloud cover, sunrise and sunset, or the like. The processor 202 may provide promotions that may be more desirable in the current or predicted weather conditions. For example, in an instance in which the weather is warm and sunny, the processor 202 may provide promotions that occur outside, or have an outdoor option, such as outdoor sports and activities, patio dining, outdoor concerts, or the like. In an example, in which the weather is cold and cloudy, the relevance module 205, an augmented reality module 209, a processor 202, or the like may provide promotions that occur indoors, such as dining in, theatre, indoor concerts and sporting events, or the like.

In an example embodiment, the relevance criteria may be the type of environment associated with the location, such as rural or metropolitan. The relevance module 205, an augmented reality module 209, a processor 202, or the like may use the environment to generate the first ranking of promotions. The environment may adjust the proximity radius for promotions. In a metropolitan area the relevance module 205, an augmented reality module 209, a processor 202, or the like may reduce the proximity radius due to density of the promotions and provider locations and the travel time required to reach more distant provider locations. In a rural area the relevance module 205, an augmented reality module 209, a processor 202, or the like may increase the proximity radius due to the lower promotion and provider location density and the travel time to reach more distant provider locations.

In an example embodiment, the relevance criteria may be an augmented reality cue. The relevance module 205, an augmented reality module 209, a processor 202, or the like may use the augmented reality cue to generate the first ranking of promotions. The relevance module 205, an augmented reality module 209, a processor 202, or the like may provide a promotion or promotions associated with the advertisement, provider, website, review, promotions, or the like associated with the augmented reality cue.

In an example embodiment, the apparatus 200 may determine whether to present promotion(s) by assigning a score to each of the promotions. Example methods for assigning scores to promotions are disclosed in U.S. patent application Ser. No. 13/411,502 and U.S. Provisional Patent Application No. 61/644,352, both of which are incorporated by reference herein in their entireties. The promotion score may be, for example, an indication of a probability that the consumer will purchase the respective promotion. In addition or alternatively, the promotion score may be a representation of a relevance the respective promotion has with the consumer.

In some embodiments, after promotions are assigned their respective promotion scores, the highest scoring promotions may be identified for inclusion in the augmented reality. However, in some embodiments, the relevance module 205 and/or augmented reality module 209 may cause the processor 202 to further utilize a second relevance criteria. The second relevance criteria may be specified by the consumer or the promotional system 102 after the generation of the first ranking. For example, the first relevance criteria may include pre-entered preferences, and historical data, the second relevance criteria may include updated relevance criteria, consumer input, change in consumer location, or the like. As such, as shown in block 1304 of FIG. 13, an apparatus, include means such as a relevance module 205 and/or augmented reality module 209, a processor 202, or the like for receiving a second relevance criteria from a consumer device 114 or the promotional system 102.

In some embodiments, the augmented reality may have limited space to display provider locations 404 within the field of view 402. In an example embodiment the provider location icons size may be associated with the level or desirability or relevance. For example, provider locations that have a higher relevance or desirability may have a larger. This is because a consumer that views the augmented reality has a greater likelihood of viewing impressions that are displayed with larger icons than with smaller icons. Further, displaying a large number of provider locations associated with a promotion may be too cluttered to view or use. Therefore the processor 202 may further rank the promotions using a second relevance criteria. Accordingly, as shown in block 1306 of FIG. 13, an apparatus 200, may include means such as a relevance module 205, augmented reality module 209, a processor 202, or the like for generating a second ranking of promotions for presentation to the consumer, wherein the second ranking is generated based on the correlating the second relevance criteria to the promotion parameters of each of the promotions in a manner as discussed in block 402.

In some embodiments, a number of provider locations associated with promotions for inclusion in the augmented reality may be set such that only the top number n of promotions having the highest promotion scores are included. In an example embodiment, a consumer may select to display more, less, or the next set of promotions using the user interface 208. In other embodiments, only those promotions meeting a predefined threshold are included. As such, as shown in block 1308 of FIG. 13, an apparatus 200 may include means, such as a relevance module 205, an augmented reality module 209, a processor 202, or the like, for comparing the second ranking of promotions to a relevancy threshold. Furthermore, as shown in block 1310 of FIG. 12, an apparatus 200, may include means such as an augmented reality module 209, relevance module 205 a processor 202, or the like, for identifying at least a portion of the second ranking based on the comparison.

Additional descriptions of relevance determination algorithms for identifying promotions relevant to a consumer that may be used alternatively or additionally are described in U.S. patent application Ser. No. 13/411,502, filed Mar. 2, 2012, titled "RELEVANCE SYSTEM FOR CONSUMER DEALS", U.S. patent application Ser. No. 13/829,581 entitled "PROMOTIONAL SYSTEM" and filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for generating an augmented reality on a consumer device, the method comprising:
    receiving, by a processor of the consumer device, camera data and location data associated with the consumer device, wherein the camera data comprises camera orientation data;
    receiving, by the processor of the consumer device, map data based on the location data associated with the consumer device,
    wherein the map data includes topographical information defining relative elevations of provider locations with respect to the consumer device
    and stored view data including visible views associated with the location data;
    receiving, by the processor of the consumer device, augmented reality cue scan data;
    generating, by the processor of the consumer device, in response to receiving the augmented reality cue scan data, an augmented reality;
    displaying, by the processor of the consumer device, via an interface of the consumer device, the augmented reality using the camera data and the stored view data;
    identifying, by the processor of the consumer device, at least one provider location that is associated with the augmented reality cue scan data;
    generating, by the processor of the consumer device, a provider location icon associated with the at least one provider location;
    determining, by the processor of the consumer device, based on the topographical information included in the map data, a relative elevation of the at least one provider location with respect to the consumer device;
    determining, by the processor of the consumer device, an overlay location for the provider location icon with respect to the camera data within the augmented reality based on the relative elevation of the at least one provider location with respect to the consumer device;
    generating, by the processor of the consumer device, within the augmented reality, the provider location icon of the at least one provider location,
    wherein the provider location icon is overlaid onto the camera data at the overlay location;
    receiving, by the processor of the consumer device, a provider location selection indication;
    determining, by the processor of the consumer device, a first promotion from a plurality of available promotions for a selected provider location based on at least one relevance criteria, wherein the relevance criteria comprises at least one of: a current weather indicator, a number of consumers in a group associated with the consumer device, a number of other consumer devices within a predetermined radius of the selected provider location, a proximity indicator indicating a distance between the consumer device and the selected provider location, and a promotion duration indicator indicating a start and end time of the first promotion;
    generating, by the processor of the consumer device, a clue incentive element within the augmented reality, wherein the clue incentive element is associated with a predetermined incentive value;
    receiving, by the processor of the consumer device, user interaction with the clue incentive element-generating, by the processor of the consumer device, in response to the received user interaction with the clue incentive element, an altered parameter value associated with a first promotion parameter of the first promotion, wherein the altered parameter value is generated based on the predetermined incentive value;
    generating, by the processor of the consumer device, a first impression, wherein the first impression comprises a partial set of promotion parameters associated with the first promotion, wherein the partial set of promotion parameters comprises at least the at least first promotion parameter associated with the altered parameter value; and
    displaying, via the interface of the consumer device, of the first impression in the augmented reality.

2. The method of claim 1, wherein determining, the first promotion from the plurality of available promotions for the selected provider location based on the at least one relevance criteria comprises:
    generating, by the processor of the consumer device, a first ranking of promotions from the plurality of available promotions, wherein the first ranking of promotions is based on correlating a first relevance criteria to the plurality of available promotions for the selected provider location; and
    selecting, by the processor of the consumer device, the first promotion from the first ranking of promotions based on a comparison of the first ranking of promotions to a predetermined relevancy threshold.

3. The method of claim 2, wherein determining, the first promotion from the plurality of available promotions for the selected provider location based on the at least one relevance criteria further includes:
receiving, by the processor of the consumer device, a second relevance criteria; and generating, by the processor of the consumer device, a second ranking of promotions from the plurality of available promotions, wherein the second ranking of promotions is generated based on correlating the first relevance criteria and the second relevance criteria to the plurality of available promotions for the selected provider location; and
selecting, by the processor of the consumer device, the first promotion from the second ranking of promotions based on a comparison of the second ranking of promotions to the predetermined relevancy threshold.

4. The method of claim 1 further comprising: receiving, by the processor of the consumer device, a proximate consumer indication associated with a first consumer device which indicates a second consumer device associated with the first consumer device proximate to the consumer device, wherein the first promotion is based on the proximate consumer indication.

5. An apparatus comprising at least one processor and at least one non-volatile memory including computer program code, the at least one non-volatile memory and the computer program code configured to, with the processor, cause the apparatus to at least:
receive camera data and location data from a consumer device, wherein the camera data comprises camera orientation data;
receive map data based on the location data associated with the consumer device, wherein the map data includes topographical information defining relative elevations of provider locations with respect to the consumer device and stored view data including visible views associated with the location data;
receive, augmented reality cue scan data, from the consumer device;
generate, in response to receiving the augmented reality cue scan data, an augmented reality;
identify at least one provider location that is associated with the augmented reality cue scan data;
generate a provider location icon associated with the at least one provider location;
determine, based on the topographical information included in the map data, a relative elevation of the at least one provider location with respect to the consumer device;
determine an overlay location for the provider location icon with respect to the camera data within the augmented reality based on the relative elevation of the at least one provider location with respect to the consumer device;
generate, within the augmented reality, the provider location icon of the at least one provider location, wherein the provider location icon is overlaid onto the camera data at the overlay location;
receive a provider location selection indication from the consumer device;
determine a first promotion from a plurality of available promotions for a selected provider location based on at least one relevance criteria, wherein the relevance criteria comprises at least one of: a current weather indicator, a number of consumers in a group associated with the consumer device, a number of other consumer devices within a predetermined distance radius of the selected provider location, a proximity indicator indicating a distance between the consumer device and the selected provider location, and a promotion duration indicator indicating a start and end time of the first promotion;
generate a clue incentive element within the augmented reality, wherein the clue incentive element is associated with a predetermined incentive value;
receive user interaction with the clue incentive element from the consumer device;
generate, in response to the received user interaction with the clue incentive element, an altered parameter value associated with a first promotion parameter of the first promotion, wherein the altered parameter value is generated based on the predetermined incentive value;
generate a first impression, wherein the first impression comprises a partial set of promotion parameters associated with the first promotion, wherein the partial set of promotion parameters comprises the at least the first promotion parameter associated with the altered parameter value; and
cause display, via an interface of the consumer device, of the first impression in the augmented reality.

6. The apparatus of claim 5, wherein the at least one non-volatile memory and the computer program code are further configured to, with the processor, cause the apparatus to:
generate a first ranking of promotions from the plurality of available promotions, wherein the first ranking of promotions is based on correlating a first relevance criteria to the plurality of available promotions for the selected provider location; and select the first promotion from the first ranking of promotions based on a comparison of the first ranking of promotions to a predetermined relevancy threshold.

7. The apparatus of claim 6, wherein the at least one memory and the computer program code are further configured to, with the processor, cause the apparatus to:
receive a second relevance criteria from the consumer device; and
generate a second ranking of promotions from the plurality of available promotions, wherein the second ranking of promotions is generated based on correlating the first relevance criteria and the second relevance criteria to the plurality of available promotions for the selected provider location; and
select the first promotion from the second ranking of promotions based on a comparison of the second ranking of promotions to the predetermined relevancy threshold.

8. The apparatus of claim 5, wherein the at least one memory and the computer program code are further configured to, with the processor, cause the apparatus to: receive a proximate consumer indication associated with a first consumer device which indicates a second consumer device associated with the first consumer device proximate to the consumer device, wherein the first promotion is based on the proximate consumer indication.

9. A computer program product comprising at least one non-transitory computer-readable storage medium having computer-executable program code portions stored therein, the computer-executable program code portions comprising program code instructions that when executed, by a processor, configure the processor to:
receive camera data and location data from a consumer device, wherein the camera data comprises camera orientation data;

receive map data based on the location data associated with the consumer device, wherein the map data includes topographical information defining relative elevations of provider locations with respect to the consumer device and stored view data including visible views associated with the location data;

receive, augmented reality cue scan data from the consumer device;

generate, in response to receiving the augmented reality cue scan data, an augmented reality;

identify at least one provider location that is associated with the augmented reality cue scan data;

generate a provider location icon associated with the at least one provider location;

determine, based on the topographical information included in the map data, a relative elevation of the at least one provider location with respect to the consumer device;

determine an overlay location for the provider location icon with respect to the camera data within the augmented reality based on the relative elevation of the at least one provider location with respect to the consumer device;

generate, within the augmented reality, the provider location icon of the at least one provider location, wherein the provider location icon is overlaid onto the camera data at the overlay location;

receive a provider location selection indication from the consumer device;

determine a first promotion from a plurality of available promotions for a selected provider location based on at least one relevance criteria, wherein the relevance criteria comprises at least one of: a current weather indicator, a number of consumers in a group associated with the consumer device, a number of other consumer devices within a predetermined radius of the selected provider location, a proximity indicator indicating a distance between the consumer device and the selected provider location, and a promotion duration indicator indicating a start and end time of the first promotion;

generate a clue incentive element within the augmented reality, wherein the clue incentive element is associated with a predetermined clue iHeeHti1reincentive value;

receive user interaction with the clue incentive element;

generate, in response to the received user interaction with the clue incentive element, an altered parameter value associated with a first promotion parameter of the first promotion, wherein the altered parameter value is generated based on the predetermined incentive value;

generate a first impression, wherein the first impression comprises a partial set of promotion parameters associated with the first promotion, wherein the partial set of promotion parameters comprises the at least the first promotion parameter associated with the altered parameter value; and cause display, via an interface of the consumer device, of the first impression in the augmented reality.

10. The computer program product of claim 9, wherein the computer-executable program code portions further comprise program code instructions that when executed, by the processor, configure the processor to:

generate a first ranking of promotions from the plurality of available promotions, wherein the first ranking of promotions is based on correlating a first relevance criteria to the plurality of available promotions for the selected provider location; and select the first promotion from the first ranking of promotions based on a comparison of the first ranking of promotions to a predetermined relevancy threshold.

11. The computer program product of claim 10, wherein the computer-executable program code portions further comprise program code instructions that when executed, by the processor, configure the processor to:

receive a second relevance criteria from the consumer device;

generate a second ranking of promotions from the plurality of available promotions, wherein the second ranking of promotions is generated based on correlating the first relevance criteria and the second relevance criteria to the plurality of available promotions for the selected provider location; and select the first promotion from the second ranking of promotions based on a comparison of the second ranking of promotions to the predetermined relevancy threshold.

12. The method of claim 1, further comprising: receiving, by the processor of the consumer device, a first impression selection indication;

generating, by the processor of the consumer device, in response to the received first impression selection indication, a second impression, wherein the second impression comprises a detailed set of promotion parameters associated with the first promotion, wherein the detailed set of promotion parameters comprises all of the partial set of promotion parameters and additional promotion parameters; and displaying, via the interface of the consumer device, the second impression in the augmented reality.

13. The method of claim 1, further comprising: determining, by the processor of the consumer device, one or more additional provider locations based on a proximity radius, wherein the proximity radius is based on the location data;

and displaying, by the processor of the consumer device, via the interface of the consumer device, based on the proximity radius, a proximity radius map within the augmented reality.

14. The method of claim 13, further comprising: determining, by the processor of the consumer device, an environment value based on the location data associated with an external environment surrounding the consumer device, wherein the external environment includes a metropolitan area or a rural area;

determining, by the processor of the consumer device, a travel mode value associated with a travel mode selected based on user input, wherein the travel mode includes a walking mode, a cycling mode, or a motorizing mode; and determining, by the processor of the consumer device, a size of the proximity radius based on the environment value the environmental value and the travel mode value.

15. The apparatus of claim 5, wherein the at least one non-volatile memory and the computer program code are further configured to, with the processor, cause the apparatus to:

receive a first impression selection indication from the consumer device;

generate, in response to the received first impression selection indication, a second impression, wherein the second impression comprises a detailed set of promotion parameters associated with the first promotion, wherein the detailed set of promotion parameters comprises all of the partial set of promotion parameters and additional promotion parameters; and display, via the interface of the consumer device, the second impression in the augmented reality.

16. The apparatus of claim 5, wherein the at least one non-volatile memory and the computer program code are further configured to, with the processor, cause the apparatus to:
   determine one or more additional provider locations based on a proximity radius, wherein the proximity radius is based on the location data; and
   display, via the interface of the consumer device, based on the proximity radius, a proximity radius map within the augmented reality.

17. The apparatus of claim 16 wherein the at least one non-volatile memory and the computer program code are further configured to, with the processor, cause the apparatus to:
   determine an environment value based on the location data associated with an external environment surrounding the consumer device, wherein the external environment includes a metropolitan area or a rural area;
   determine a travel mode value associated with a travel mode selected based on user input, wherein the travel mode includes a walking mode, a cycling mode, or a motorizing mode; and
   determine a size of the proximity radius based on the environment value and the travel mode value.

18. The computer program product of claim 9, wherein the computer-executable program code portions further comprise program code instructions that when executed, by the processor, configure the processor to:
   receive a first impression selection indication from the consumer device;
   generate, in response to the received first impression selection indication, a second impression, wherein the second impression comprises a detailed set of promotion parameters associated with the first promotion, wherein the detailed set of promotion parameters comprises all of the partial set of promotion parameters and additional promotion parameters; and
   display, via the interface of the consumer device, the second impression in the augmented reality.

19. The computer program product of claim 9, wherein the computer-executable program code portions further comprise program code instructions that when executed, by the processor, configure the processor to: determine one or more additional provider locations based on a proximity radius, wherein the proximity radius is based on the location data; and
   display, via the interface of the consumer device, based on the proximity radius, a proximity radius map within the augmented reality.

20. The computer program product of claim 19, wherein the computer-executable program code portions further comprise program code instructions that when executed, by the processor, configure the processor to: determine an environment value based on the location data associated with an external environment surrounding the consumer device, wherein the external environment include a metropolitan area or a rural area;
   determine a travel mode value associated with a travel mode selected based on user input, wherein the travel mode includes a walking mode, a cycling mode, or a motorizing mode; and determine a size of the proximity radius based on the environment value and the travel mode value.

21. The method of claim 1, further comprising:
   receiving, by the processor of the consumer device, a view-lock indicator; and locking, by the processor of the consumer device, the camera orientation data in response to receiving the view-lock indicator.

22. The apparatus of claim 5, wherein the at least one non-volatile memory and the computer program code are further configured to, with the processor, cause the apparatus to: receive a view-lock indicator; and
   lock the camera orientation data in response to receiving the view-lock indicator.

23. The computer program product of claim 9 wherein the computer program code instructions, when executed by the processor, further configure the processor to:
   receive a view-lock indicator from the consumer device; and
   lock the camera orientation data in response to receiving the view-lock indicator.

24. The method of claim 1, wherein receiving the user interaction with the clue incentive element comprises:
   receiving, by the processor of the consumer device, the user interaction representing a user using the augmented reality to search and view the first promotion,
   wherein the first impression is generated in response to the user interaction.

25. The apparatus of claim 5, wherein to receive the user interaction with the clue incentive element, the at least one non-volatile memory and the computer program code cause the apparatus to: receive the user interaction representing a user using the augmented reality to search and view the first promotion,
   wherein the first impression is generated in response to the received user interaction.

26. The computer program product of claim 9 wherein to receive the user interaction with the clue incentive element, the computer program code instructions, when executed by the processor, configure the processor to:
   receive the user interaction representing a user using the augmented reality to search and view the first promotion,
   wherein the first impression is generated in response to the received user interaction.

27. The method of claim 1, wherein the first promotion parameter comprises a price parameter associated with the first promotion.

28. The apparatus of claim 5, wherein the first promotion parameter comprises a price parameter associated with the first promotion.

29. The computer program product of claim 9, wherein the first promotion parameter comprises a price parameter associated with the first promotion.

* * * * *